(12) United States Patent
Stafford et al.

(10) Patent No.: US 10,534,454 B2
(45) Date of Patent: Jan. 14, 2020

(54) HEAD-MOUNTED DISPLAY TO CONTROLLER CLOCK SYNCHRONIZATION OVER EM FIELD

(71) Applicant: Sony Interactive Entertainment Inc., Tokyo (JP)

(72) Inventors: Jeffrey Stafford, San Mateo, CA (US); Takeo Matsukawa, San Mateo, CA (US); Yuichiro Nakamura, San Mateo, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 49 days.

(21) Appl. No.: 15/887,877

(22) Filed: Feb. 2, 2018

(65) Prior Publication Data

US 2019/0243472 A1    Aug. 8, 2019

(51) Int. Cl.
| | |
|---|---|
| *G06F 3/038* | (2013.01) |
| *A63F 13/25* | (2014.01) |
| *A63F 13/52* | (2014.01) |
| *G01D 5/249* | (2006.01) |
| *G01P 13/00* | (2006.01) |
| *G06F 1/16* | (2006.01) |

(Continued)

(52) U.S. Cl.
CPC ............ *G06F 3/0383* (2013.01); *A63F 13/25* (2014.09); *A63F 13/52* (2014.09); *G01D 5/2492* (2013.01); *G01P 13/00* (2013.01); *G06F 1/1601* (2013.01); *G06F 3/0346* (2013.01); *G06F 3/14* (2013.01)

(58) Field of Classification Search
CPC combination set(s) only.
See application file for complete search history.

(56) References Cited

U.S. PATENT DOCUMENTS

| | | | |
|---|---|---|---|
| 2007/0164895 A1* | 7/2007 | Anderson | ............. G01S 13/825 |
| | | | 342/42 |
| 2010/0009752 A1 | 1/2010 | Rubin et al. | |

(Continued)

OTHER PUBLICATIONS

Bello, Marcos_PCT Notification of Transmittal of the International Search Report and the Written Opinion of the International Searching Authority, or the Declaration _ dated Mar. 28, 2019_10 pages.

*Primary Examiner* — Mark Edwards
(74) *Attorney, Agent, or Firm* — Penilla IP, APC

(57) ABSTRACT

A system, including: a computing device that executes an interactive application and generates and transmits image frames; a head-mounted display (HMD) that receives and presents the image frames, wherein the HMD includes a magnetic emitter that emits a magnetic signal having a synchronization encoding synchronized to the received image frames; a controller device that includes a magnetic sensor that detects the magnetic signal, wherein the controller device processes the detected magnetic signal to determine magnetic position data and read the synchronization encoding, wherein the controller device uses the synchronization encoding to generate corresponding timing data indicating a timing of the magnetic position data based on the synchronization encoding, wherein the controller device transmits the magnetic position data and the corresponding timing data to the computing device; wherein the computing device uses the magnetic position data and the corresponding timing data to determine the location and/or orientation of the controller device.

18 Claims, 13 Drawing Sheets

(51) Int. Cl.
*G06F 3/0346* (2013.01)
*G06F 3/14* (2006.01)

(56) References Cited

U.S. PATENT DOCUMENTS

| | | | |
|---|---|---|---|
| 2011/0267269 A1* | 11/2011 | Tardif | G06F 3/011 |
| | | | 345/158 |
| 2014/0364212 A1 | 12/2014 | Osman et al. | |
| 2015/0258431 A1 | 9/2015 | Stafford et al. | |
| 2017/0070337 A1* | 3/2017 | Giriyappa | H04L 12/4633 |
| 2018/0108179 A1* | 4/2018 | Tomlin | G02B 27/0172 |

* cited by examiner

HEAD-MOUNTED DISPLAY TO CONTROLLER CLOCK SYNCHRONIZATION OVER EM FIELD

BACKGROUND

1. Field of the Disclosure

The present disclosure relates to head-mounted display to controller clock synchronization over an electromagnetic field.

2. Description of the Related Art

The video game industry has seen many changes over the years. As computing power has expanded, developers of video games have likewise created game software that takes advantage of these increases in computing power. To this end, video game developers have been coding games that incorporate sophisticated operations and mathematics to produce very detailed and engaging gaming experiences.

Example gaming platforms include the Sony Playstation®, Sony Playstation2® (PS2), Sony Playstation3® (PS3), and Sony Playstation4® (PS4), each of which is sold in the form of a game console. As is well known, the game console is designed to connect to a display (typically a television) and enable user interaction through handheld controllers. The game console is designed with specialized processing hardware, including a CPU, a graphics synthesizer for processing intensive graphics operations, a vector unit for performing geometry transformations, and other glue hardware, firmware, and software. The game console may be further designed with an optical disc reader for receiving game discs for local play through the game console. Online gaming is also possible, where a user can interactively play against or with other users over the Internet. As game complexity continues to intrigue players, game and hardware manufacturers have continued to innovate to enable additional interactivity and computer programs.

A growing trend in the computer gaming industry is to develop games that increase the interaction between the user and the gaming system. One way of accomplishing a richer interactive experience is to use wireless game controllers whose movement is tracked by the gaming system in order to track the player's movements and use these movements as inputs for the game. Generally speaking, gesture input refers to having an electronic device such as a computing system, video game console, smart appliance, etc., react to some gesture made by the player and captured by the electronic device.

Another way of accomplishing a more immersive interactive experience is to use a head-mounted display (HMD). A head-mounted display is worn by the user and can be configured to present various graphics, such as a view of a virtual space. The graphics presented on a head-mounted display can cover a large portion or even all of a user's field of view. Hence, a head-mounted display can provide a visually immersive virtual reality experience to the user, as the HMD renders a three-dimensional real-time view of the virtual environment in a manner that is responsive to the user's movements. The user wearing an HMD is afforded freedom of movement in all directions, and accordingly can be provided a view of the virtual environment in all directions via the HMD.

It is in this context that implementations of the disclosure arise.

SUMMARY

Implementations of the present disclosure include devices, methods and systems relating to head-mounted display to controller clock synchronization over an electromagnetic field (EM Field).

In some implementations, a system is provided, including: a computing device that executes an interactive application and generates and transmits image frames at a predefined frame rate, the image frames being generated based on an application state of the executing interactive application; a head-mounted display (HMD) that receives the image frames transmitted from the computing device and presents the image frames through a display device of the HMD, wherein the HMD includes a magnetic emitter that emits a magnetic signal, the magnetic signal having a synchronization encoding that is synchronized to the received image frames from the computing device; a controller device that includes a magnetic sensor that detects the magnetic signal, wherein the controller device processes the detected magnetic signal to determine magnetic position data that identifies a location and/or orientation of the controller device, wherein the controller device further processes the detected magnetic signal to read the synchronization encoding, wherein the controller device uses the synchronization encoding to generate corresponding timing data for the magnetic position data, the timing data indicating a timing of the magnetic position data based on the synchronization encoding, wherein the controller device transmits the magnetic position data and the corresponding timing data to the computing device; wherein the computing device uses the magnetic position data and the corresponding timing data to determine the location and/or orientation of the controller device, wherein the computing device uses the location and/or orientation of the controller device to update the application state of the executing interactive application.

In some implementations, the transmission of the image frames is defined by transmission of video signals including a timing signal that signals a beginning of each image frame in accordance with the predefined frame rate; wherein the synchronization encoding of the magnetic signal is synchronized to the timing signal.

In some implementations, the timing signal is a vertical sync signal.

In some implementations, the synchronization encoding of the magnetic signal is defined by modulation of one or more of a frequency or an amplitude of the magnetic signal.

In some implementations, the modulation defines a repeated pattern of changes to the magnetic signal that is synchronized to the timing signal.

In some implementations, generating the corresponding timing data includes using the synchronization encoding to correct for a drift of a clock of the controller device from the synchronization encoding.

In some implementations, the location and/or orientation of the controller device is relative to the HMD.

In some implementations, the timing data enables synchronization of the magnetic position data to the generation of the image frames.

In some implementations, the controller device includes at least one motion sensor that generates samples of motion data, wherein the controller device uses the synchronization encoding to generate a corresponding time stamp for each sample of motion sensor data, and wherein the controller device transmits the samples of motion data and the corresponding time stamps to the computing device; wherein the computing device uses the samples of motion data and the corresponding time stamps to determine a location and/or orientation of the controller device, the location and/or orientation of the controller device being used to update the application state of the executing interactive application.

In some implementations, generating the corresponding time stamp for a given sample of motion sensor data includes using the synchronization encoding to correct for a drift of a clock of the controller device from the synchronization encoding.

In some implementations, a method is provided, including: executing, by a computing device, an interactive application and generating and transmitting image frames at a predefined frame rate by the computing device, the image frames being generated based on an application state of the executing interactive application; receiving, by a head-mounted display (HMD), the image frames transmitted from the computing device and presenting the image frames through a display device of the HMD, and emitting, by a magnetic emitter of the HMD, a magnetic signal, the magnetic signal having a synchronization encoding that is synchronized to the received image frames from the computing device; detecting, by a controller device that includes a magnetic sensor, the magnetic signal, and processing, by the controller device, the detected magnetic signal to determine magnetic position data that identifies a location and/or orientation of the controller device, wherein the controller device further processes the detected magnetic signal to read the synchronization encoding, wherein the controller device uses the synchronization encoding to generate corresponding timing data for the magnetic position data, the timing data indicating a timing of the magnetic position data based on the synchronization encoding, wherein the controller device transmits the magnetic position data and the corresponding timing data to the computing device; wherein the computing device uses the magnetic position data and the corresponding timing data to determine the location and/or orientation of the controller device, wherein the computing device uses the location and/or orientation of the controller device to update the application state of the executing interactive application.

Other aspects and advantages of the disclosure will become apparent from the following detailed description, taken in conjunction with the accompanying drawings, illustrating by way of example the principles of the disclosure.

BRIEF DESCRIPTION OF THE DRAWINGS

The disclosure may be better understood by reference to the following description taken in conjunction with the accompanying drawings in which:

FIGS. 8A-1 and 8A-2 illustrate a head-mounted display (HMD), in accordance with an implementation of the disclosure.

DETAILED DESCRIPTION

Figure 1:
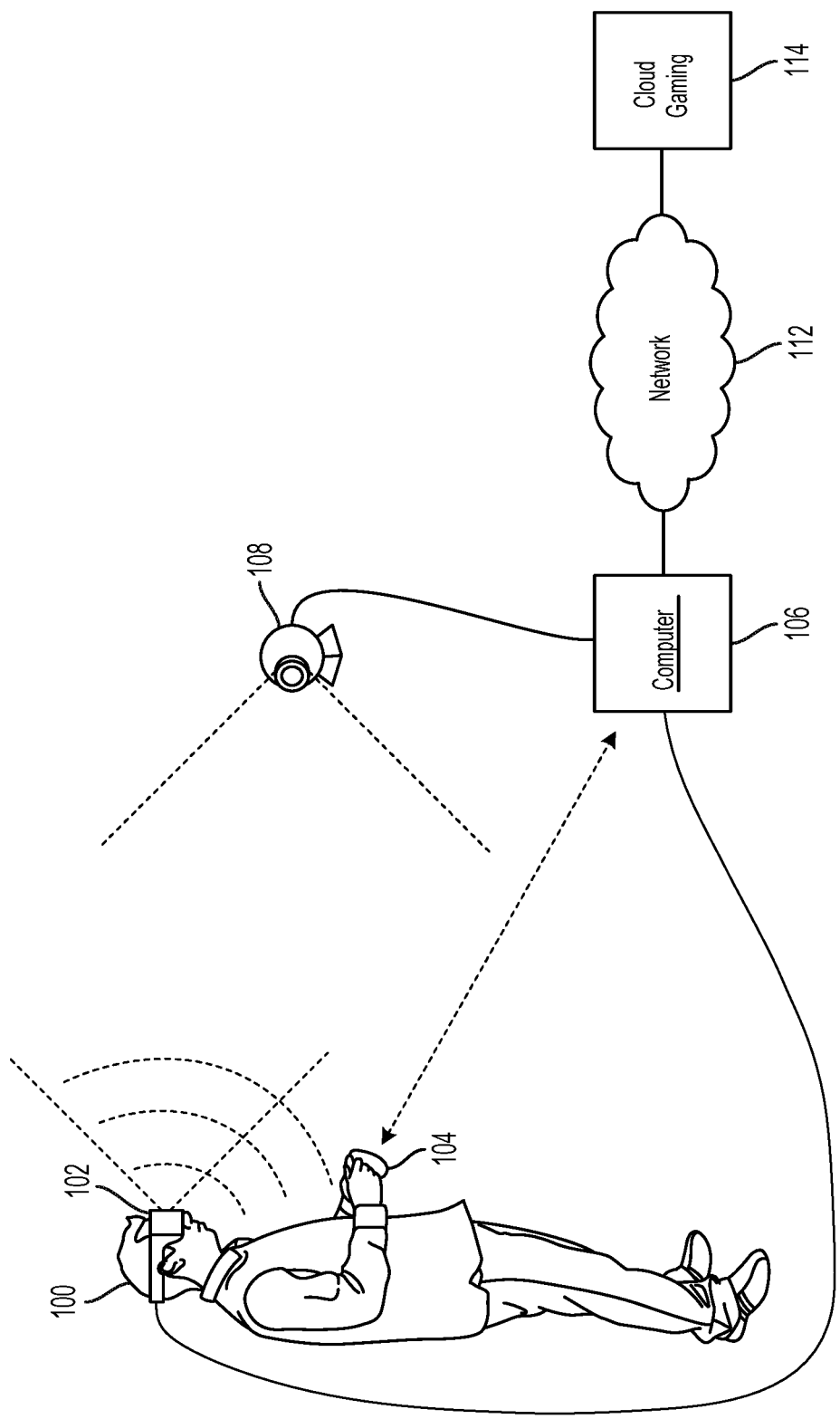
FIG. 1 illustrates a system for interaction with a virtual environment via a head-mounted display (HMD), in accordance with an implementation of the disclosure.

The following implementations of the present disclosure provide devices, methods, and systems relating to head-mounted display to controller clock synchronization over an electromagnetic field. It will be obvious, however, to one skilled in the art that the present disclosure may be practiced without some or all of the specific details presently described. In other instances, well known process operations have not been described in detail in order not to unnecessarily obscure the present disclosure.

In various implementations, the methods, systems, image capture objects, sensors and associated interface objects (e.g., gloves, controllers, peripheral devices, props, smartphones, etc.) are configured to process data that is configured to be rendered in substantial real-time on a display screen. Broadly speaking, implementations are described with reference to the display being of a head mounted display (HMD). However, in other implementations, the display may be of a second screen, a display of a portable device, a computer display, a display panel, a display of one or more remotely connected users (e.g., whom may be viewing content or sharing in an interactive experience), or the like. While the term "display" is generally understood to include the use of display screens as devices that enable images to be seen by a user's eyes, it will be appreciated that the term "display" as used herein can further encompass any type of imaging technology that enables images to be seen by the user (e.g. retinal projection, holographic projection, etc.). In some implementations, the HMD 102 includes projection devices that enable light from virtual images to be shown to a user's eyes via any such technology (e.g. retinal projectors).

A HMD system that supports wireless controllers may positionally track them from the reference of the HMD using electromagnetics. The HMD may also have positional tracking, but use an entirely different tracking system. For example, the HMD may use a camera based SLAM system. The controllers would track their position and/or orientation relative to the HMD via measuring the amplitude of various frequencies of electromagnetic waves emitted by a transmitter fixed to the HMD. One major issue of this system is that the real-time clock signals of the controller and the HMD may differ. This difference (synchronization error) will cause errors to appear in the controller tracking when attempting to render the virtual controllers in a VR/AR scene presented in the HMD when the HMD is moving (and thus the magnetic transmission source is also moving). It is therefore required to synchronize/minimize the real-time clock differences between the controller and the HMD.

Typically these devices are connected to a host computer (e.g. console) via wireless transmission (e.g. WiFi or Bluetooth), which can have variable latency to the communication. It is therefore difficult to synchronize the real-clocks to certain accuracy between the controller and the HMD via the host computer over the wireless transmission.

Current electromagnetic tracking systems can transmit their magnetic field almost instantaneously to a magnetic receiver. Typical Magnetic receivers read samples of the magnetic field at rates of over 100 Khz. This mechanism can be utilized to solve the above problem. During a special phase (once at boot up of the HMD and the controllers or at a time specified by the host) the electromagnetic transmitter mounted on the HMD can be modulated/pulsed in a unique manner to encode and signal the HMD's real-time clock value to the controller. The controller's magnetic sensor can decode/demodulate/depulse the real-time clock value from the electromagnetic signals and thus adjust it's own reported timestamps to synchronize it's real-time clock with the HMD's real-time clock. Due to the very high sampling rate of the magnetic receiver, the expected accuracy of the synchronization should be well under 10 microseconds.

FIG. 1 illustrates a system for interaction with a virtual environment via a head-mounted display (HMD), in accordance with implementations of the disclosure. An HMD may also be referred to as a virtual reality (VR) headset, an augmented reality (AR) headset, or a mixed reality headset (mixture of both VR and AR). As used herein, the term "virtual reality" (VR) generally refers to user interaction with a virtual space/environment that involves viewing the virtual space through an HMD (or VR headset) in a manner that is responsive in real-time to the movements of the HMD (as controlled by the user) to provide the sensation to the user of being in the virtual space. For example, the user may see a three-dimensional (3D) view of the virtual space when facing in a given direction, and when the user turns to a side and thereby turns the HMD likewise, then the view to that side in the virtual space is rendered on the HMD.

In the illustrated implementation, a user 100 is shown wearing a head-mounted display (HMD) 102. The HMD 102 is worn in a manner similar to glasses, goggles, or a helmet, and is configured to display a video game or other content to the user 100. The HMD 102 provides a very immersive experience to the user by virtue of its provision of display mechanisms in close proximity to the user's eyes. Thus, the HMD 102 can provide display regions to each of the user's eyes which occupy large portions or even the entirety of the field of view of the user, and may also provide viewing with three-dimensional depth and perspective.

In the illustrated implementation, the HMD 102 is connected to a computer 106 by a wired connection. In other implementations, the HMD 102 is connected to the computer 106 through a wireless connection. In some instances, the computer is disposed inside the HMD and is directly connected. The computer 106 can be any general or special purpose computer or computing device known in the art, including but not limited to, a gaming console, personal computer, laptop, tablet computer, mobile device, cellular phone, tablet, thin client, set-top box, media streaming device, etc. In some implementations, the computer 106 can be configured to execute a video game, and output the video and audio from the video game for rendering by the HMD 102. In some implementations, the computer 106 is configured to execute any other type of interactive application that provides a virtual space/environment that can be viewed through an HMD. The computer 106 is configured to transmit (by wired connection or wireless connection) the video and audio from the video game to the HMD 102 for rendering thereon. The computer 106 may include a transceiver that includes a transmitter for transmission of data to the HMD 102, as well as a receiver for receiving data that is transmitted by the HMD 102.

In some implementations, the HMD 102 may also communicate with the computer through alternative mechanisms or channels, such as via a network 112 to which both the HMD 102 and the computer 106 are connected.

The user 100 may operate a controller device 104 to provide input for the video game. The controller device 104 can be any type of interface object operable by the user 100 for providing input to the video game or interactive application. By way of example without limitation, the controller device 104 can be any type of motion tracked object for interfacing a virtual environment or video game, such as a game controller, prop, peripheral, glove, smartphone, tablet, etc. The way the user interfaces with the virtual reality scene displayed in the HMD 102 can vary, and other interface devices in addition to controller device 104, can be used. For instance, various kinds of single-handed, as well as two-handed controllers can be used. In some implementations, the controllers can be tracked by tracking lights included in the controllers, or tracking of shapes, sensors, and inertial data associated with the controllers. Using these various types of controllers, or even simply hand gestures that are made and captured by one or more cameras, it is possible to interface, control, maneuver, interact with, and participate in the virtual reality environment presented on the HMD 102.

A camera 108 can be configured to capture images of the interactive environment in which the user 100 is located. These captured images can be analyzed to determine the location and movements of the user 100, the HMD 102, and the controller device 104. In some implementations, the controller device 104 includes a light which can be tracked, and/or inertial/motion sensor(s), to enable determination of the controller device's location and orientation and tracking of movements. Additionally, the HMD 102 may include one or more lights which can be tracked, as well as inertial/motion sensors, to enable determination and tracking of the location and orientation of the HMD 102.

The camera 108 can include one or more microphones to capture sound from the interactive environment. Sound captured by a microphone array may be processed to identify the location of a sound source. Sound from an identified location can be selectively utilized or processed to the exclusion of other sounds not from the identified location. Furthermore, the camera 108 can be defined to include multiple image capture devices (e.g. stereoscopic pair of cameras), an IR camera, a depth camera, and combinations thereof.

Tracking of the HMD 102 and controller device 104 via the camera 108 can be subject to occlusion problems. For example, if the user turns around or otherwise maneuvers the controller device 104 in a manner such that the camera's view of the controller device 104 is obstructed, then the tracking of the controller device will be compromised. Similarly, it is possible for the user's movements to cause the camera's view of the HMD 102, or portions thereof, to be obstructed in some way, thereby negatively impacting the tracking of the HMD 102. Hence, it is desirable to track the HMD 102 and the controller device 104 in a way that is not subject to occlusion problems that can occur with visual tracking systems that rely on an external camera.

Thus, in some implementations, the HMD 102 is configured to perform "inside-out" tracking—that is, wherein the HMD is capable of determining and tracking its location and orientation in space without relying on sensing hardware that is external to the HMD. For example, in some implementations, the HMD 102 itself includes one or more externally facing cameras. The captured images from such externally facing cameras can be processed, e.g. using a simultaneous localization and mapping (SLAM) technique, to enable tracking of the HMD. In some implementations, the HMD 102 can be used to map the local environment through such cameras during an initialization process. For example, during such an initialization process, the user may be requested to move the HMD 102 throughout the local environment so that the local environment can be captured through such externally facing cameras and mapped to facilitate tracking of the HMD during interactive use. The HMD 102 can further include various motion sensors (e.g. accelerometers, gyroscopes, magnetometers, inertial measurement unit (IMU)), and sensor fusion techniques can be applied to use data from such motion sensors in combination with captured image data from the externally facing cameras to enable the HMD tracking.

In some implementations, the controller device 104 is tracked relative to the HMD 102. For example, in some implementations, the HMD 102 includes a magnetic source that emits a magnetic field, and the controller device 104 includes a magnetic sensor that detects the magnetic field, and the magnetic sensor data is used to determine and track the location and orientation of the controller device 104, both relative to the HMD 102 and by extension in the real space of the local environment. Such a configuration employing magnetic tracking is advantageous because the system is less likely to be subject to interference of the magnetic field, as the controller device 104 when operated by the user 100 is expected to be proximate to the HMD 102.

In some implementations, the controller device 104 may also be tracked relative to the HMD 102, at least in part, using the externally facing cameras of the HMD. The captured images from such externally facing cameras may include the interface object 104, and such captured images can be analyzed to determine, at least in part, the location/orientation of the interface object 104 relative to the HMD 102.

In some implementations, the computer 106 functions as a thin client in communication over a network 112 with a cloud gaming/application provider 114. In such an implementation, generally speaking, the cloud gaming/application provider 114 maintains and executes the video game being played (or application being interacted with) by the user 102. The computer 106 transmits inputs from the HMD 102, the controller device 104 and the camera 108, to the cloud gaming provider, which processes the inputs to affect the game state of the executing video game. The output from the executing video game, such as video data, audio data, and haptic feedback data, is transmitted to the computer 106. The computer 106 may further process the data before transmission or may directly transmit the data to the relevant devices. For example, video and audio streams are provided to the HMD 102, whereas a haptic/vibration feedback command is provided to the controller device 104.

In some implementations, the HMD 102, controller device 104, and camera 108, may themselves be networked devices that connect to the network 112, for example to communicate with the cloud gaming provider 114. In some implementations, the computer 106 may be a local network device, such as a router, that does not otherwise perform video game processing, but which facilitates passage of network traffic. The connections to the network by the HMD 102, controller device 104, and camera 108 may be wired or wireless.

Additionally, though implementations in the present disclosure may be described with reference to a head-mounted display, it will be appreciated that in other implementations, non-head mounted displays may be substituted, including without limitation, portable device screens (e.g. tablet, smartphone, laptop, etc.) or any other type of display that can be configured to render video and/or provide for display of an interactive scene or virtual environment in accordance with the present implementations.

Figure 2:
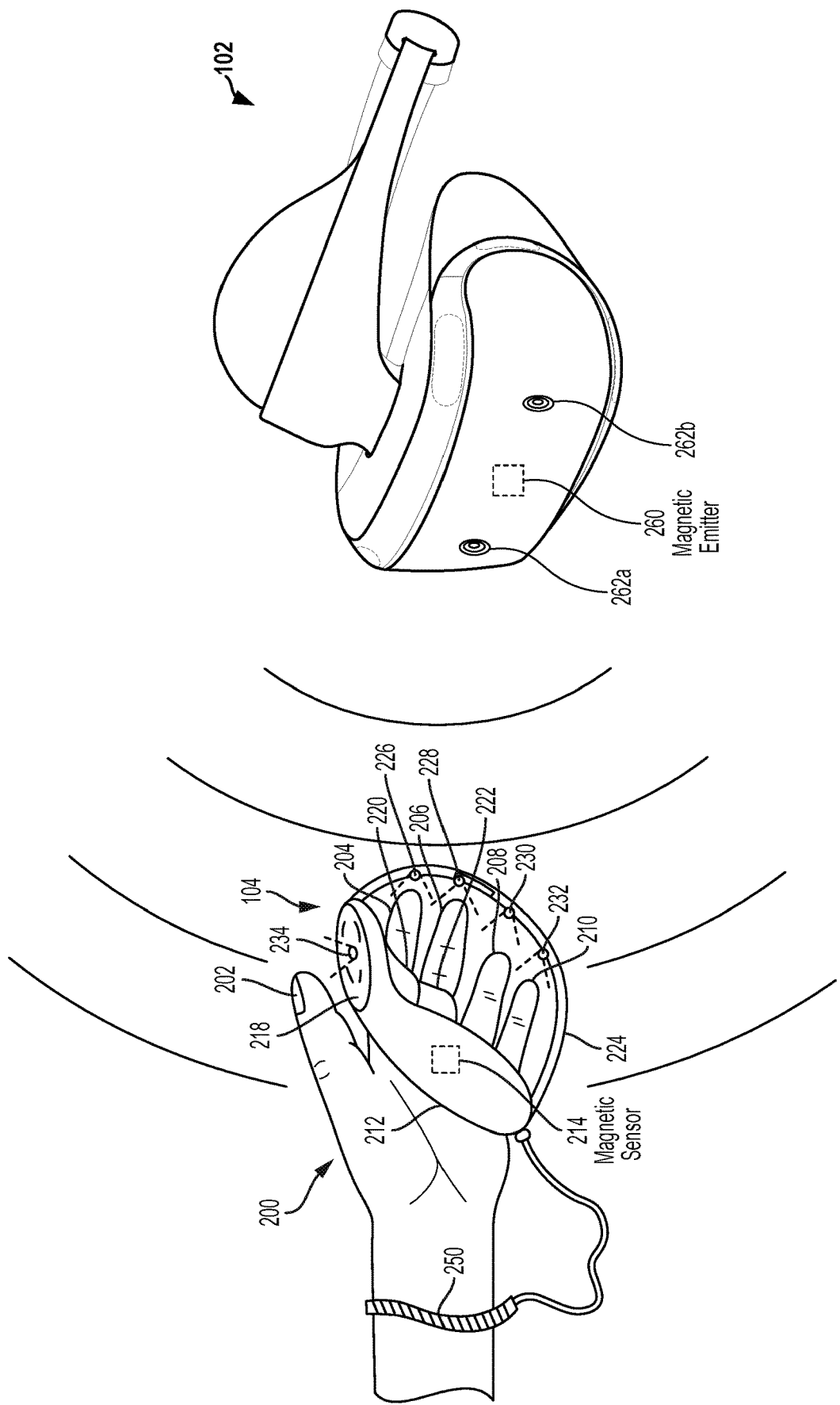
FIG. 2 illustrates a controller device 104 for interacting with a virtual space viewed through an HMD 102, in accordance with implementations of the disclosure.

FIG. 2 illustrates a controller device 104 for interacting with a virtual space viewed through an HMD 102, in accordance with implementations of the disclosure. Broadly speaking, the controller device 104 is configured to be handheld and/or secured to the user's hand 200. In some implementations, a strap (or band, or other mechanism for attachment) for securing the controller device 104 to the user's hand 200 is provided (not shown). In some implementations, such a strap is configured to wrap around the palm portion of the user's hand 200, thereby securing the controller device 104 against the user's palm. In some implementations, such a palm strap is configured to substantially encircle the user's palm when in use, with a portion/length of the strap being fixed/mounted to the side of the controller device 104, thereby securing the controller device to the user's hand. In some implementations, the strap mechanism includes a locking mechanism that enables the strap to be toggled between a locked configuration that secures the controller against the user's palm, and a released configuration that loosens the strap and/or moves a portion of it away from the controller body. The locking mechanism can thus make the controller device firmly snap to the user's hand, or partially release from the user's hand.

In some implementations, the controller device 104 includes a wrist strap 250 to secure the controller device 104 to the user's wrist.

The controller device 104 is configured to be trackable in the three-dimensional real space of the local environment in which the controller device 104 is disposed. To this end, the controller device 104 may include any of various motion/orientation/inertial sensors, including by way of example without limitation, one or more accelerometers, magnetometers, and gyroscopes. Furthermore, the controller device 104 may include one or more magnetic sensors 214 (e.g. magnetometer, Hall effect sensor, inductive sensor, etc.) that are configured to detect the strength and/or orientation of a magnetic field that is emitted by a magnetic emitter 260 which is included in the HMD 102. Data or information from the motion/orientation/inertial sensors and the magnetic sensors can be processed to determine and track the location and orientation of the controller device 104. Such data processing can be performed by the controller device 104 and/or the computing device 106 and/or the HMD 102.

In the illustrated implementation, the controller device 104 includes a main housing 212 that is configured to be held or gripped by the user's hand 200. The controller device 104 further includes a thumb pad 218 that is positioned where the thumb 202 of the user's hand 200 would naturally fall when holding the controller device 104. In some implementations, the thumb pad is a touch-sensitive surface or touchpad capable of providing touch-based input. In some implementations, the thumb pad is a directional pad that facilitates directional input. In some implementations, the thumb pad is clickable or capable of being depressed similar to a button.

The thumb pad 218 further includes a proximity sensor 234 which is configured to detect the proximity of the thumb 202 to the thumb pad 218. In so doing, the proximity sensor 234 may indicate an amount of flexion or extension of the user's thumb 202.

A trigger 220 is configured to be operated by the index finger 204 of the user's hand 200, whereas the trigger 222 is configured to be operated by the middle finger 204 of the user's hand 200, when operating the controller device 104. The triggers 220 and 222 further include proximity sensors 236 and 238 (shown at FIG. 2B), respectively, which are configured to detect the proximity of the user's index finger 204 and middle finger 206 to the triggers 220 and 222, respectively. The proximity sensors 236 and 238 thus indicate an amount of flexion or extension of the index and middle fingers, respectively. That is, when the user's index finger 204 increases in flexion (decreases in extension), its proximity to the proximity sensor 236 increases; and when the user's index finger 204 decreases in flexion (increases in extension), its proximity to the proximity sensor 236 decreases. Similarly, when the user's middle finger 206 increases in flexion (decreases in extension), its proximity to the proximity sensor 238 increases; and when the user's middle finger 206 decreases in flexion (increases in extension), its proximity to the proximity sensor 238 decreases.

Additionally, the controller device 104 includes proximity sensors 240 and 242 (shown at FIG. 2C), which are positioned at locations along the lower portion of the housing 212 so as to detect the proximity of the user's ring finger 208 and pinky finger 210, respectively. The proximity sensors 240 and 242 thus indicate amounts of flexion or extension of the ring and pinky fingers, respectively. That is, when the user's ring finger 208 increases in flexion (decreases in extension), its proximity to the proximity sensor 240 increases; and when the user's ring finger 208 decreases in flexion (increases in extension), its proximity to the proximity sensor 240 decreases. Similarly, when the user's pinky finger 210 increases in flexion (decreases in extension), its proximity to the proximity sensor 242 increases; and when the user's pinky finger 210 decreases in flexion (increases in extension), its proximity to the proximity sensor 242 decreases.

The controller device 104 further includes a band 224, having proximity sensors 226, 228, 230, and 232. These proximity sensors are positioned by the structure of the band 224 to be proximate to the fingertips of the index, middle, ring, and pinky fingers, respectively, when these fingers are extended. In other words, when the user's index finger 204 increases in extension (decreases in flexion), its proximity to the proximity sensor 226 increases; and when the user's index finger 204 decreases in extension (increases in flexion), its proximity to the proximity sensor 226 decreases. When the user's middle finger 206 increases in extension (decreases in flexion), its proximity to the proximity sensor 228 increases; and when the user's middle finger 206 decreases in extension (increases in flexion), its proximity to the proximity sensor 228 decreases. When the user's ring finger 208 increases in extension (decreases in flexion), its proximity to the proximity sensor 230 increases; and when the user's ring finger 208 decreases in extension (increases in flexion), its proximity to the proximity sensor 230 decreases. When the user's pinky finger 210 increases in extension (decreases in flexion), its proximity to the proximity sensor 232 increases; and when the user's pinky finger 210 decreases in extension (increases in flexion), its proximity to the proximity sensor 232 decreases.

In view of the foregoing, the controller device 104 can be configured so that two proximity sensors per finger are used to detect the flexion/extension of the user's index, middle, ring, and pinky fingers. Thus, each finger has a corresponding proximity sensor pair, with the sensors being aligned substantially along the plane of flexion/extension for a given finger to which the sensors are assigned, but at opposite ends of the finger's range of motion. For example, the sensors 226 and 236, which are configured to detect the user's index finger 204, are aligned substantially along the plane of flexion/extension of the user's index finger 204. Furthermore, the sensor 226 is positioned so as to be near to (or possibly touching) the distal end of the index finger 204 when extended, whereas the sensor 236 is positioned so as to be closer to the proximal end of the index finger 204 when extended. It will be appreciated that a similar arrangement and positioning of the sensor pairs for the other fingers also applies.

Accordingly, in some implementations, the sensors 226, 228, 230, and 232 are considered to be distal sensors, whereas the sensors 236, 238, 240, and 242 are considered to be proximal sensors, based on their respective positioning relative to the distal and proximal ends of the user's fingers when extended. The pair of proximal and distal sensors for a given finger are utilized together to determine the postures of the given finger. It will be appreciated that the proximity sensing ranges of the distal and proximal sensors for a given finger may overlap with each other. Thus, in some implementations, as the posture of the finger changes from a maximally flexed posture to a maximally extended posture (e.g. as permitted by the structure/form of the controller device 104), the finger may be initially detectable by the proximal sensor only (as it is not within the detection range of the distal sensor), and then detectable by both the proximal and the distal sensors as it enters the detection range of the distal sensor while still being within the detection range of the proximal sensor, and finally detectable by only the distal sensor as the finger leaves the detection range of the proximal sensor.

Though not specifically shown, in some implementations, the controller device 104 can include one or more lights or illuminated objects, which can be recognized in captured images of the local environment and tracked to enable location and orientation tracking of the controller device 104. By way of example without limitation, one or more lights can be positioned along the band 224 and/or along the housing 212 of the controller device 104.

As shown, the HMD 102 includes externally facing cameras 262a and 262b, which are configured to capture images of the local environment, such captured images being processed and analyzed to determine the location/orientation of the HMD 102 in the local environment. As noted, the HMD 102 includes a magnetic emitter 260 that is configured to emit a magnetic field that is sensed by the magnetic sensor 214 of the controller device 104. The sensed magnetic field is used to determine the location/orientation of the controller device 104 relative to the HMD 102.

Figure 3:
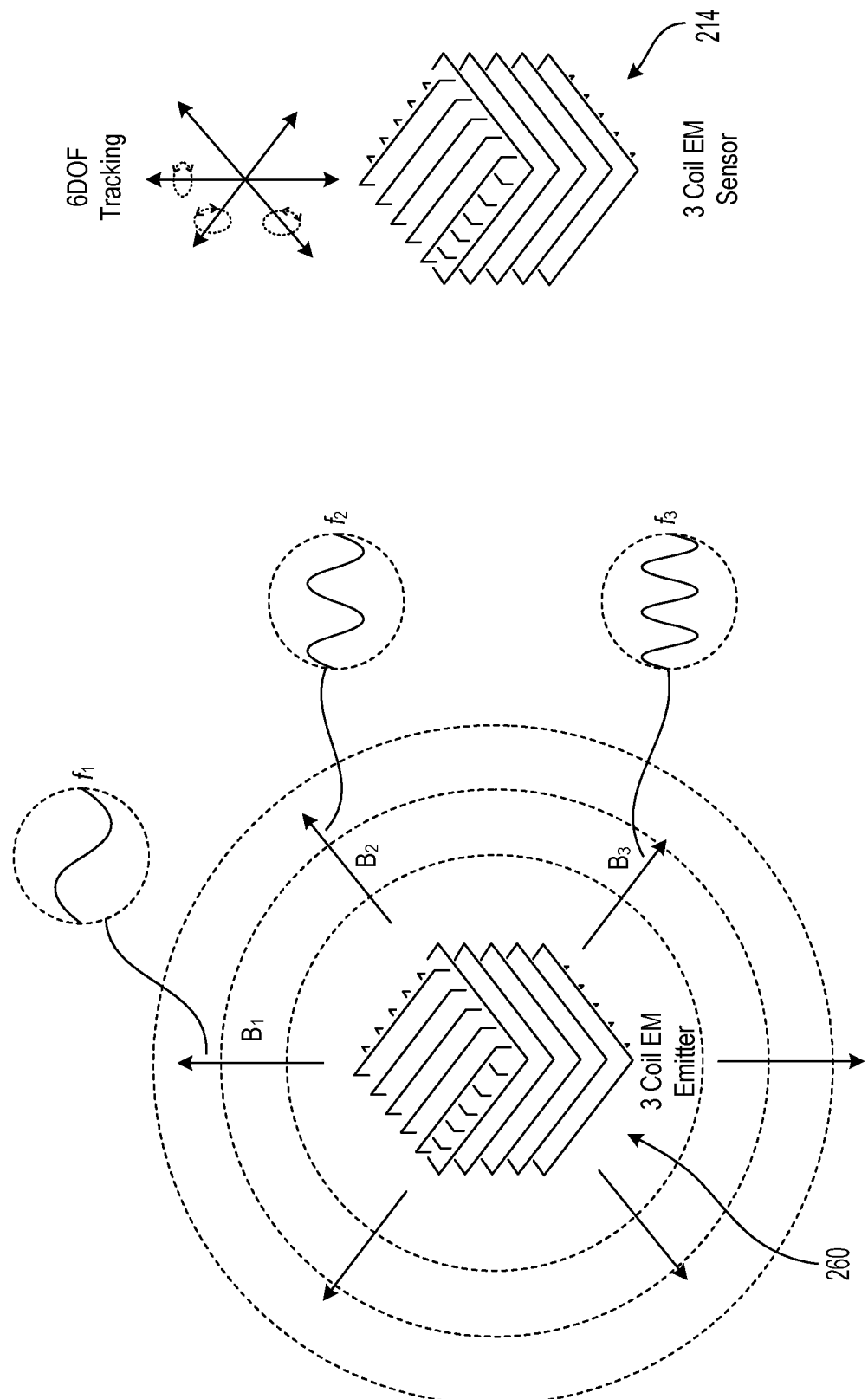
FIG. 3 conceptually illustrates a magnetic emitter 260 and magnetic sensor 214, in accordance with implementations of the disclosure.

FIG. 3 conceptually illustrates a magnetic emitter 260 and magnetic sensor 214, in accordance with implementations of the disclosure. In some implementations, the magnetic emitter 260 includes three emitter coils that are perpendicular to each other, so as to be aligned along three perpendicular axes. The emitter coils can be concentrically arranged so as to be centered about the same point. Each of the emitter coils can be configured to emit an AC magnetic field at a frequency that differs from the other emitter coils.

In some implementations, the magnetic sensor 214 includes three sensor coils that are perpendicular to each other, so as to be aligned along three perpendicular axes. The sensor coils can be concentrically arranged so as to be centered about the same point. Each of the sensor coils can be configured to receive the magnetic fields generated by the magnetic emitter 260. Broadly speaking, the magnetic fields generated by the magnetic emitter 260 induce currents in the sensor coils of the magnetic sensor 214, which are processed to determine the location and/or orientation of the magnetic sensor 214 relative to the magnetic emitter 260, and by extension the location and/or orientation of the controller device 104 to the HMD 102. It will be appreciated that that the induced currents produce an output voltage that is time-varying in accordance with the time-varying magnetic flux produced by the frequency of the emitted magnetic field. Thus, the frequency of the induced current in a given sensor coil can be detected to identify the emitter coil that provided the magnetic field.

By using the aforementioned magnetic emitter 260 and magnetic sensor 214, six degree of freedom tracking (6DOF) tracking can be provided. That is, the three-dimensional location of the magnetic sensor 214 relative to the magnetic emitter 260 can be determined and tracked, and the three-dimensional orientation (e.g. pitch, roll, and yaw) of the magnetic sensor 214 relative to the magnetic emitter 260 can be determined and tracked. By extension, this provides six degree of freedom tracking of the controller device 104 relative to the HMD 102.

Use of a magnetic tracking setup for tracking interface objects such as a controller device 104 is useful, external camera-based tracking of a controller is subject to occlusion problems (e.g. user turns around and blocks the camera's view of the controller). Also, by having the magnetic emitter 260 included in the HMD 102, no additional peripheral devices are required for tracking the controller device 104.

However, a problem arises because the tracking of the controller device 104 is being performed via the HMD 102, which is itself moving as the user 100 maneuvers their head in space. An average human user can fairly easily rotate their head at about 350 degrees/second, and may rotate their head at up to about 1000 degrees/second in certain situations. And such a human user may maneuver the controller device 104 even faster. Thus, in the time that it takes for position/motion data from the HMD 102 and the controller device 104 to be communicated to the computer 106 and processed to render the next image frame that will be communicated to the HMD 102 (for subsequent display thereon), the HMD 102 and/or the controller device 104 may have moved.

Broadly speaking, at a given point in time, the controller device 104 obtains a position/orientation sample via magnetic signal sensing, and obtains an inertial measurement unit (IMU) sample. During that time, the user's 100 head can move. All signals are filtered through a Kalman filter that predicts where the HMD 102 will be to render the next frame, to show correct view when displayed on the HMD in the future. Thus, in order to obtain the most accurate position of the controller that is correct for the rendered frame rate (e.g. 120 Hz), it is important to account for the fact that while tracking the controller device 104, the head is also moving the HMD 102. And if the system does not have accurate synchronization between the HMD 102 and the controller device 104, then when the system derives the position of the controller, there will be a mismatch. If they are out of sync, then the rendering of the controller device 104 in the HMD 102 view will tend to look wobbly as the user 100 moves around. Thus, it is important to have an accurate way to synchronize the two systems so that motion samples from the HMD 102 and the controller device 104 can be matched to each other or otherwise accurately placed in time relative to each other. This can entail synchronizing the clocks of the HMD 102 and the controller device 104 and/or correcting for drift between them.

It will be appreciated that wireless protocols such as Bluetooth® or WiFi or others are not suitable for synchronization between the HMD 102 and the controller device 104 because they entail too much overhead (e.g. 10 ms delay) and data is not transmitted/received with sufficiently precise timing. Therefore, other methods for achieving the synchronization are sought.

Figure 4:
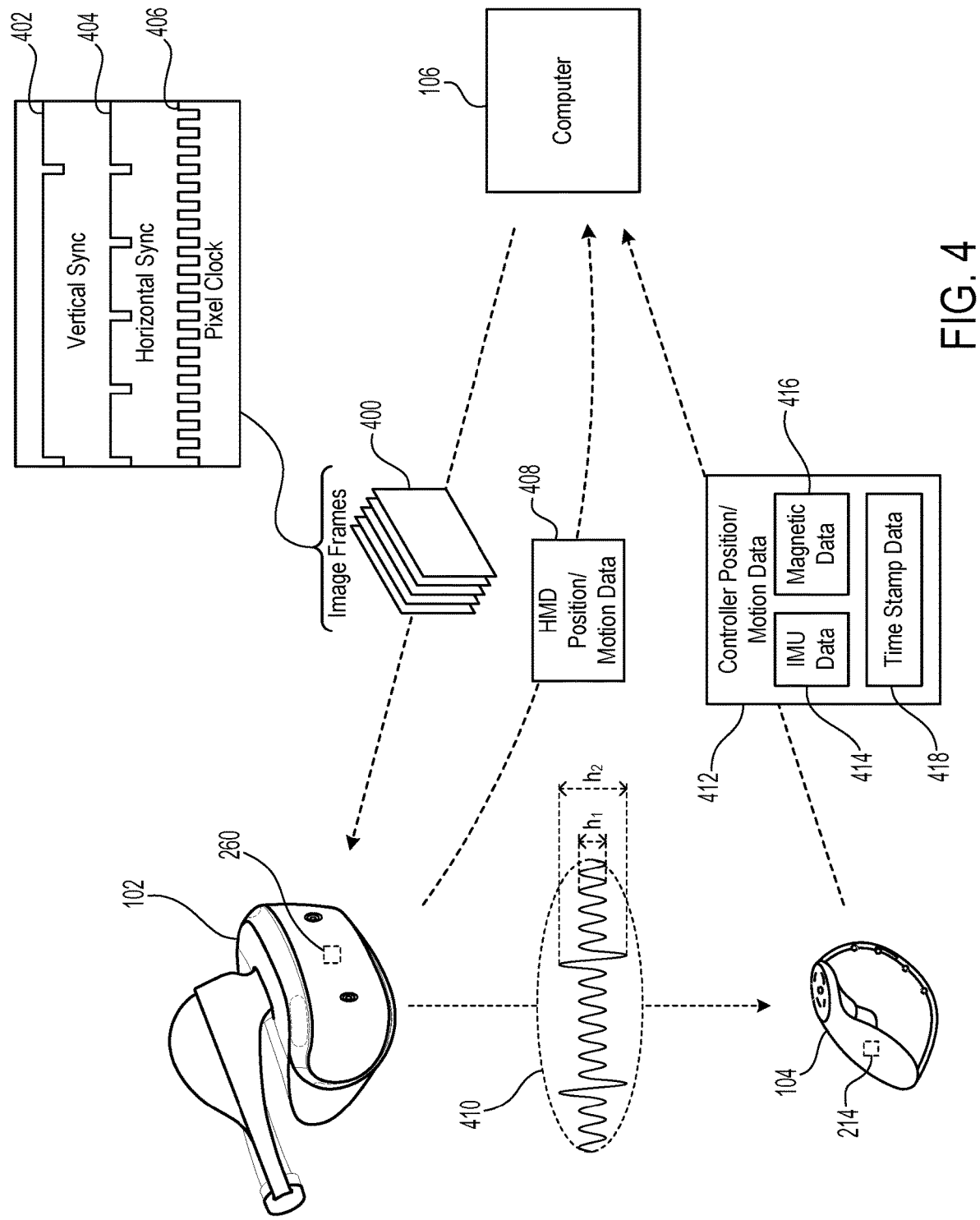
FIG. 4 conceptually illustrates a system for synchronizing position/motion data between an HMD 102 and a controller device 104, in accordance with implementations of the disclosure.

FIG. 4 conceptually illustrates a system for synchronizing position/motion data between an HMD 102 and a controller device 104, in accordance with implementations of the disclosure. In the illustrated implementation, the computer 106 executes an interactive application (e.g. a video game), and generates image frames 400 that are transmitted to the HMD 102. In some implementations, the transmission of the image frames occurs over a wired connection between the computer 106 and the HMD 102, whereas in other implementations, the transmission occurs over a wireless connection.

In some implementations, the transmission of the image frames 400 occurs over a synchronous connection to ensure that the image frames are provided at a constant frame rate for presentation through the display of the HMD 102. In some implementations, the transmission of the image frames 400 is defined by a video signal that encodes data for raster scanning by the display of the HMD 102. In some implementations, the video signal includes data signals which define parameters (e.g. color values, luminance/intensity values, etc.) of pixels of the display of the HMD 102, and timing signals which define when the data for each frame, line and pixel begins and ends. The timing signals are conceptually shown in the illustrated implementation. The vertical sync signal 402 identifies the start and end of each image frame. The horizontal sync signal 404 identifies the start and end of each line of a given image frame. And the pixel clock signal 406 identifies the start and end of each pixel and determines the data transfer rate of the video signal.

It will be appreciated that the image frames 400 are provided at a constant frame rate (e.g. 120 Hz, 240 Hz, etc.). As such, the vertical sync signal 402 is periodic in accordance with the frame rate. That is, the vertical sync signal 402 has the same constant periodic rate (or frequency) as the frame rate. Therefore this vertical sync signal 402 can be used as a reliable signal to enable synchronization between devices in the system.

For example, as noted above the location and/or orientation of the HMD 102 may be tracked using position/motion data 408 obtained and/or processed from an IMU and from externally-facing cameras of the HMD 102. This position/motion data 408 can be synchronized based on the vertical sync signal 402. For example, the position/motion data 408 may be time-stamped based on the vertical sync signal 402, so that the position/motion data 408 is correlated to a time stamp that is synchronized with the vertical sync signal 402.

For example, the vertical sync signal 402 will have a predefined frequency that is known, which therefore defines a clock that is synchronized to the computer 106. For example, a vertical sync signal 402 frequency of 120 Hz means that 120 cycles of the vertical sync signal 402 will define one second of time, as determined by the computer 106. The HMD 102 may have its own clock (e.g. quartz crystal clock), and any drift between the HMD's 102 clock and the vertical sync signal 402 can be tracked. The position/motion data 408 may be initially time-stamped based on the HMD 102's clock, but this time stamp can be adjusted to correct for the identified drift between the HMD 102's clock and the vertical sync signal 402. In this manner, the position/motion data 408 for the HMD 102 can be synchronized to the computer 106. It will be appreciated that as the position/motion data 408 is correctly time stamped (in accordance with the computer 106 clock, by using the vertical sync signal 402 as presently described), the HMD position/motion data 408 may be transmitted to the computer 106 over an asynchronous connection. This is possible because the time stamp has been properly synchronized, and the position/motion data can be utilized to accurately determine and/or predict the location and/or orientation of the HMD 102, even if not received by the computer 106 in a synchronous fashion.

In some implementations, the magnetic emitter 260 of the HMD 102 is configured to emit a magnetic signal (by producing an AC electromagnetic field; conceptually illustrated at ref. 410) that is encoded in a manner that is synchronized to the vertical sync signal 402, and therefore synchronized to the computer 106. It will be appreciated that various techniques can be employed to provide the synchronization encoding of the magnetic signal 410.

In some implementations, the magnetic emitter 260 is configured to emit the magnetic signal 410 at a frequency that is synchronized to the vertical sync signal 402. For example, the magnetic emitter 260 may emit the magnetic signal 410 as a continuous wave (e.g. sine wave, square wave, triangular wave, etc.), and the amplitude peaks and troughs of the magnetic signal 410 can be configured to be synchronized with the vertical sync signal 402. By way of example without limitation, the magnetic signal 410 may have a frequency that is the same as or is a multiple of the frame rate. In some implementations, to achieve synchronization of the magnetic signal 410, the vertical sync signal 402 is used to drive the generation of the magnetic signal 410 by the magnetic emitter 260.

In such an implementation, the magnetic sensor 214 detects the magnetic signal 410, and the controller device 104 can be configured to detect peaks in the magnetic signal 410. The detected peaks of the magnetic signal 410 will be synchronized as described above, and can be utilized as a clock signal by the controller device 104 to ensure synchronization with the vertical sync signal 402. In a simple example, if the magnetic signal 410 has a frequency of 120 Hz, then every 120 peaks detected in succession will equal one second of time in accordance with the vertical sync signal 402 and the computer 106. If present, then any drift between a clock of the controller device 104 and the clock defined by the magnetic signal 410 can be determined and tracked.

The controller device 104 is configured to obtain and/or process IMU data 414 from an IMU of the controller device 104, and magnetic data 416 from the magnetic sensor 214. This data may be initially time-stamped based on the controller device's 104 clock, but this time stamp can be adjusted to correct for the identified drift between the controller device 104 clock and the magnetic signal 410. As the magnetic signal 410 is synchronized to the vertical sync signal 402 which originates from the computer 106, in this manner, the controller position/motion data 412 for the controller device 104 can be synchronized to the computer 106. It will be appreciated that as the position/motion data 412 is correctly time stamped with time stamp data 418 (in accordance with the computer 106 clock, by using the magnetic signal 410 as presently described), the controller position/motion data 412 may also be transmitted to the computer 106 over an asynchronous connection. This is possible because the time stamp data 418 has been properly synchronized, and the position/motion data can be utilized to accurately determine and/or predict the location and/or orientation of the controller device 104, even if not received by the computer 106 in a synchronous fashion.

It will be appreciated that though the amplitude of the magnetic signal 410 changes with distance (gaussian exponential falloff), the frequency of the magnetic signal 410 does not change with distance. Furthermore, as noted above, the magnetic emitter 260 may include multiple coils (e.g. three coils) that each produce a magnetic signal at a given frequency that differs from that of the other coils. The multiple frequencies can be detected by the magnetic sensor 214 and utilized in combination to provide more robust synchronization.

In some implementations, the magnetic signal 410 is utilized as a carrier wave for the synchronization encoding. That is, the magnetic signal 410 is generated having a given frequency in accordance with the HMD 102 clock (and not necessarily based on the vertical sync signal 402), but further modulation is applied that is synchronized to the vertical sync signal 402. Thus, the magnetic signal 410 functions as a modulated carrier wave, with the modulation encoding synchronization data that enables synchronization to the vertical sync signal 402. In some implementations, the modulation has a frequency that is significantly less than a frequency of the underlying carrier wave. For example, the magnetic signal 410 may have an underlying frequency of about 20 to 200 kHz, whereas the modulation has a frequency of, by way of example without limitation, 240 Hz (again, the modulation frequency of 240 Hz being specifically synchronized to the vertical sync signal 402, whereas the underlying 20-200 kHz frequency is not).

In various implementations, any type of modulation can be applied for the synchronization encoding, provided it can be detected and decoded/demodulated/processed by the controller device 104 to enable synchronization to the vertical sync signal 402. In some implementations, the modulation has a periodic duty cycle that is synchronized to the vertical sync signal 402. In some implementations, an amplitude modulation is applied, such as by periodically cycling the amplitude (e.g. sine wave, etc.), pulsing the amplitude (pulses and/or gaps may be synchronized to the vertical sync signal 402), periodically increasing or reducing the amplitude, etc. For example, in the illustrated implementation, the magnetic signal 410 has an underlying amplitude $h_1$, but is modulated so as to periodically spike the amplitude to $h_2$, at a regular rate that is synchronized to the vertical sync signal 402. In some implementations, a frequency modulation is applied, such as by periodically cycling the frequency (e.g. sine wave, etc.), periodically changing between discreet frequency values, etc.

It will be appreciated that the amplitude of the magnetic signal 410, even when modulated, provides an indication of the distance of the magnetic emitter 260 from the magnetic sensor 214, whereas the modulation indicates the timing of the vertical sync signal 402. Thus, the magnetic signal 410 is used as a carrier wave for purposes of synchronization. In this manner, the existing magnetic signal 410 that is used for tracking the controller device 104 is also used to enable proper synchronization.

In some implementations, detection of the encoding of the magnetic signal 410 triggers the sampling of the IMU data 414. For example, detection of a peak (e.g. a spike in amplitude) or other modulated event in the magnetic signal 410 can be configured to trigger sampling of an IMU of the controller device 104 to generate the IMU data 414 and its associated time stamp data. In this manner, the sampling of the IMU is synchronized based on the encoded magnetic signal 410, which is synchronized to the vertical sync signal 402 as previously described.

Figure 5:
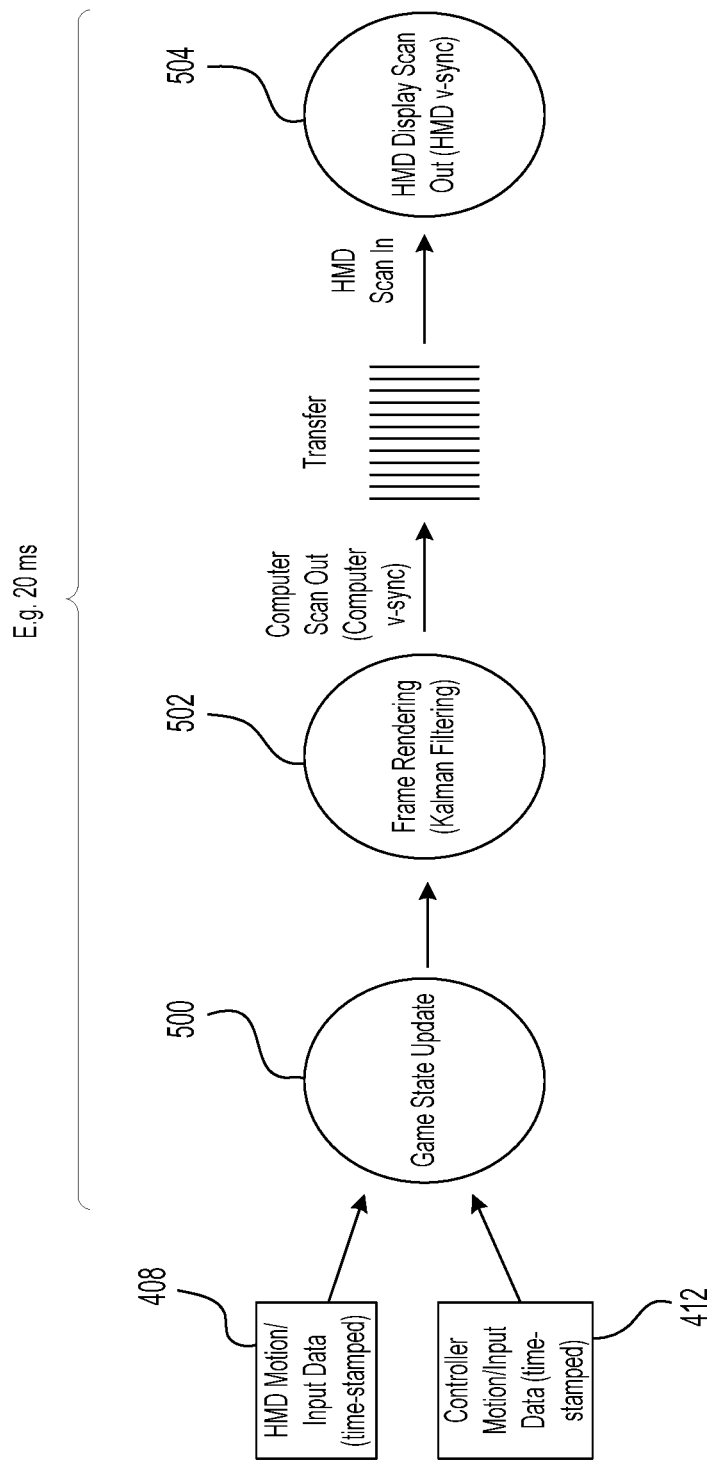
FIG. 5 conceptually illustrates a process for generating image frames and presenting them to a user of an HMD, in accordance with implementations of the disclosure.

FIG. 5 conceptually illustrates a process for generating image frames and presenting them to a user of an HMD, in accordance with implementations of the disclosure. HMD motion/input data 408 and controller motion/input data 412 are provided to the computer 106. These data are time-stamped as described in the present disclosure, with their time stamps adjusted so as to be synchronized to the vertical sync signal 402. At operation 500, the game state of an executing video game (or the application state of an executing interactive application, such as a VR application) is updated based on the HMD motion/input data 408 and/or the controller motion/input data 412. At operation 502, the next image frame is rendered based on the updated game/application state. This may entail application of Kalman filtering to the HMD position/motion data and the controller position/motion data to predict the future locations and orientations of the HMD 102 and the controller device 104 at the expected time that the generated frame will be scanned out to the HMD 102 display and thereby made visible to the user 100.

The generated image frames are scanned out with the vertical sync signal 402, which is the v-sync of the computer 106. The image frames are transferred over a wired or wireless connection, and then scanned in at the HMD 102. At operation 504, the HMD 102 display scans out according to its own v-sync, presenting the image frame to the user 100 for viewing.

It will be appreciated that all of these processes take time, and thus the frame rendering is predictive in nature. That is, the frame rendering is based on the predicted location/orientation of the HMD 102 and controller device 104 at the expected time that the image frame will be presented/scanned out through the display of the HMD 102. This predictive rendering is important because while image frames are being rendered, transferred, and eventually scanned out at the HMD 102, the user's head may be moving, and therefore, by the time a rendered image frame becomes visible to the user 100, the user's view has changed. Thus, by predictively rendering the image frames based on predicted future locations and orientations of the HMD 102 and the controller device 104, a better user experience is provided in that the image frames will better match the actual location of the user's head at the time of viewing. This predictive rendering is important as it removes the perceived latency of the virtual scene when presented to a user.

It should be appreciated that the time stamp data which is associated with the HMD position/motion data 408 and the controller position/motion data 412 need not be specifically expressed in units of time, but may have any numerical form or scale, such as a counter of arbitrary units, provided it enables accurate determination of the timing of the position or motion data with which it is associated (e.g. IMU data, magnetic data, image-based tracking data, etc.).

In some implementations, the computer 106 is configured to process the HMD position/motion data 408 and the controller position/motion data 412 using known offsets between the various devices of the system. For example, the HMD position/motion data 408 will be time stamped in synchronization to the vertical sync signal 402 (e.g. adjusted to correct for any drift of the HMD 102 clock from the vertical sync signal 402). However, the time stamp will not necessarily account for the delay resulting from the vertical sync signal 402 being generated, transferred to the HMD 102 and processed at the HMD 102 (e.g. scanned in and applied for synchronization). This delay will be constant and predefined, and therefore, the computer 106 can be configured to account for this delay as a regular offset from the computer 106 vertical sync signal 402 when interpreting the time stamps of the HMD position/motion data 408. That is, the time stamps may be treated by the computer 106 as being offset from the vertical sync signal 402 by a predefined amount.

In a similar manner, the time stamp data 418 for the controller position/motion data 412 may also not necessarily account for the delay in communicating the synchronization information from the computer 106 to the controller device 104. That is, there is a cumulative delay resulting from the generation of the vertical sync signal 402, transfer to the HMD 102, processing by the HMD 102 to generate the encoded magnetic signal 410, sensing of the magnetic signal 410 and decoding by the controller device 104, and application of the decoded information for synchronization. Again, this delay will be constant and predefined, and therefore, the computer 106 can be configured to account for this delay as a regular offset from the computer 106 vertical sync signal 402 when interpreting the time stamp data 418 of the controller position/motion data 412. That is, the time stamps may be treated by the computer 106 as being offset from the vertical sync signal 402 by a predefined amount that reflects this cumulative delay.

Figure 6:
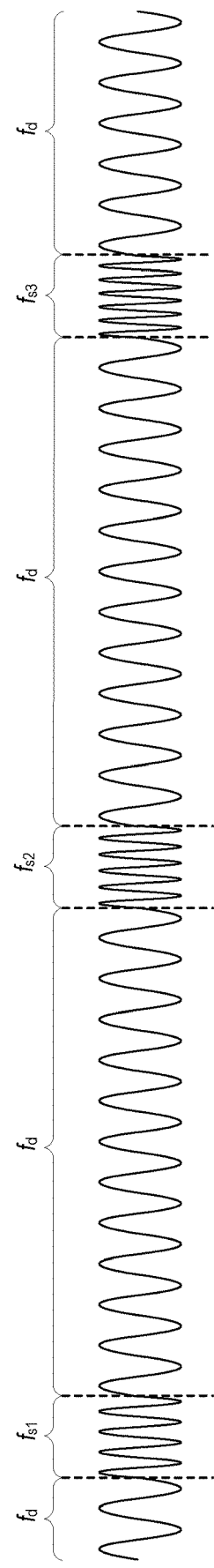
FIG. 6 illustrates a magnetic signal having discreet frequency modulation applied for purposes of synchronization, in accordance with implementations of the disclosure.

FIG. 6 illustrates a magnetic signal having discreet frequency modulation applied for purposes of synchronization, in accordance with implementations of the disclosure. In some implementations, the magnetic signal employs a round robin of different frequencies interposed at predefined intervals of the underlying carrier wave. In the illustrated implementation, the underlying carrier has a frequency $f_d$. The carrier is modulated to three different additional frequencies which differ from each other and from frequency $f_d$. As shown, these include frequencies $f_{s1}$, $f_{s2}$ and $f_{s3}$. The timing of the frequencies $f_{s1}$, $f_{s2}$ and $f_{s3}$ is configured to be synchronized to the vertical sync signal 402. By using multiple modulated frequencies that are distinct from each other, the synchronization timing can be more robustly established.

Figure 7:
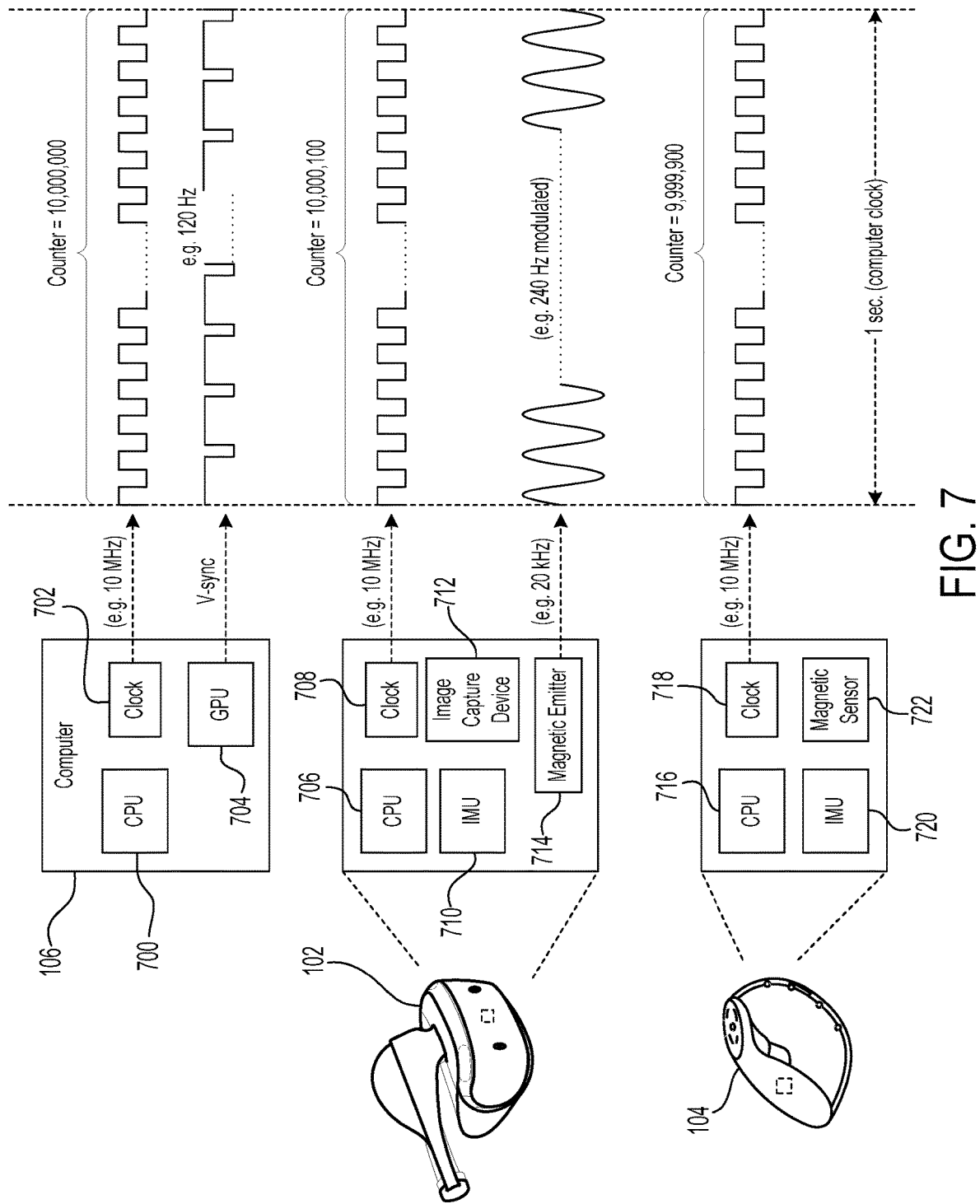
FIG. 7 conceptually illustrates the drift between clocks of the computer 106, HMD 102, and controller device 104, in accordance with implementations of the disclosure.

FIG. 7 conceptually illustrates the drift between clocks of the computer 106, HMD 102, and controller device 104, in accordance with implementations of the disclosure. As shown, the computer 106 includes a CPU 700, a clock 702 (e.g. quartz crystal clock), and a GPU 704. The clock 702 provides a clock signal to synchronize the operations of the computer 106, such as various processing operations performed by the CPU 700 and GPU 704. For purposes of illustration, if the clock signal from the clock is at 10 MHz, then over the course of one second of time (according to the computer 106 clock signal) a counter that counts the number of cycles of the clock signal will count 10 million cycles. The GPU 704 generates a v-sync signal at, by way of example without limitation, 120 Hz. This v-sync signal is based on, and thereby synchronized to, the computer clock 702 signal. Thus, the v-sync signal will exhibit 120 cycles over the course of one second of time.

The HMD 102 includes a CPU 706 for performing process operations, and a clock 708 (e.g. quartz crystal clock) that generates a HMD clock signal. The HMD clock signal governs the timing of operations at the HMD 102. If the HMD clock signal is nominally generated at a frequency of 10 MHz, then it may not precisely match the computer clock signal due to variances in clock performance. That is, over time, the HMD clock 708 will drift from the computer clock 702. Thus by way of example in the illustrated implementation, while the computer clock 702 signal exhibits 10 million cycles in one second of time, the HMD clock 708 signal may exhibit 10,000,100 cycles over the same period of time. Thus, the HMD clock 708 is running slightly faster than the computer clock 702. However, this drift between the clocks can be accounted for by using the v-sync signal at the HMD 102. For example, a counter of clock cycles on the HMD 102 may count 10,000,100 for every 120 cycles of the v-sync signal, and thereby identify the drift/error of the HMD clock signal relative to the v-sync signal (and by extension, the computer clock signal). The samples from the IMU 710 and image data from the image capture device 712 of the HMD 102 (or position/motion data processed therefrom) will have time stamps that are originally based on the HMD clock 708 signal. However, these time stamps can be corrected based on the identified drift of the HMD clock signal. And thus, when the position/motion data is communicated back to the computer 106 for processing, its time stamp is synchronized to the v-sync signal and the computer clock 702. By way of example without limitation, the time stamp of position/motion data collected at the one second mark might originally be time stamped with the counter value of 10,000,100; however, this will be corrected to a value of 10,000,000.

The magnetic emitter 714 of the HMD 102 emits a magnetic signal at a high frequency (e.g. 20 to 200 kHz), but is modulated at a lower frequency in synchronization with the v-sync signal received from the computer 106 (e.g. 240 Hz modulation).

The controller device 104 also includes a clock 718 that governs the timing of operations at the controller device 104, including those of a CPU 716 for processing operations, an IMU 720, and magnetic sensor 722. The clock signal from the controller clock 718 may drift from that of the computer 106. For example, over the course of one second of time according to the computer clock signal, the controller clock signal at a nominal 20 MHz frequency may exhibit 9,999,900 cycles. Thus, the controller clock 718 is running slower than the computer clock 702. However, the magnetic sensor 722 receives the magnetic signal from the magnetic emitter 714, and the sensed magnetic signal is decoded/demodulated to identify the 240 Hz modulation that is synchronized to the v-sync signal. Using this information, time stamps for samples from the IMU 720 and magnetic sensor 722 (or position/motion data processed therefrom) can be corrected so as to be synchronized with the v-sync signal, and by extension the computer clock 702 signal. By way of example without limitation, the time stamp of position/motion data collected at the one second mark might originally be time stamped with the counter value of 9,999,900; however, this will be corrected to a value of 10,000,000.

In some implementations, the system can optionally take into account the speed of the magnetic signal, which is equivalent to the speed of light. That is, the system can account for the amount of time that is required for the magnetic signal to travel from the HMD 102 to the controller device 104. It will be appreciated that this may entail using previously known positions of the HMD 102 and the controller device 104 to approximate the current distance between the HMD 102 and the controller device 104. It will be appreciated that over the short distance (<2 m) from the user's head to their hands the time difference from the sending of the magnetic signal to the receiving of the magnetic signal is very small (<7 ns). Thus, in some implementations, this difference may be small enough to be safely ignored, as it will not significantly impact the performance of the system and will not be noticed by the user.

While implementations of the disclosure have been described with reference to a system including an HMD and a controller device, it will be appreciated that the principles of the present disclosure can be applied to any system including devices that show virtual images (e.g. smartphone, tablet, other displays, etc.) with other tracked devices (e.g. glove, drone, etc.).

Figures 1, 8A:
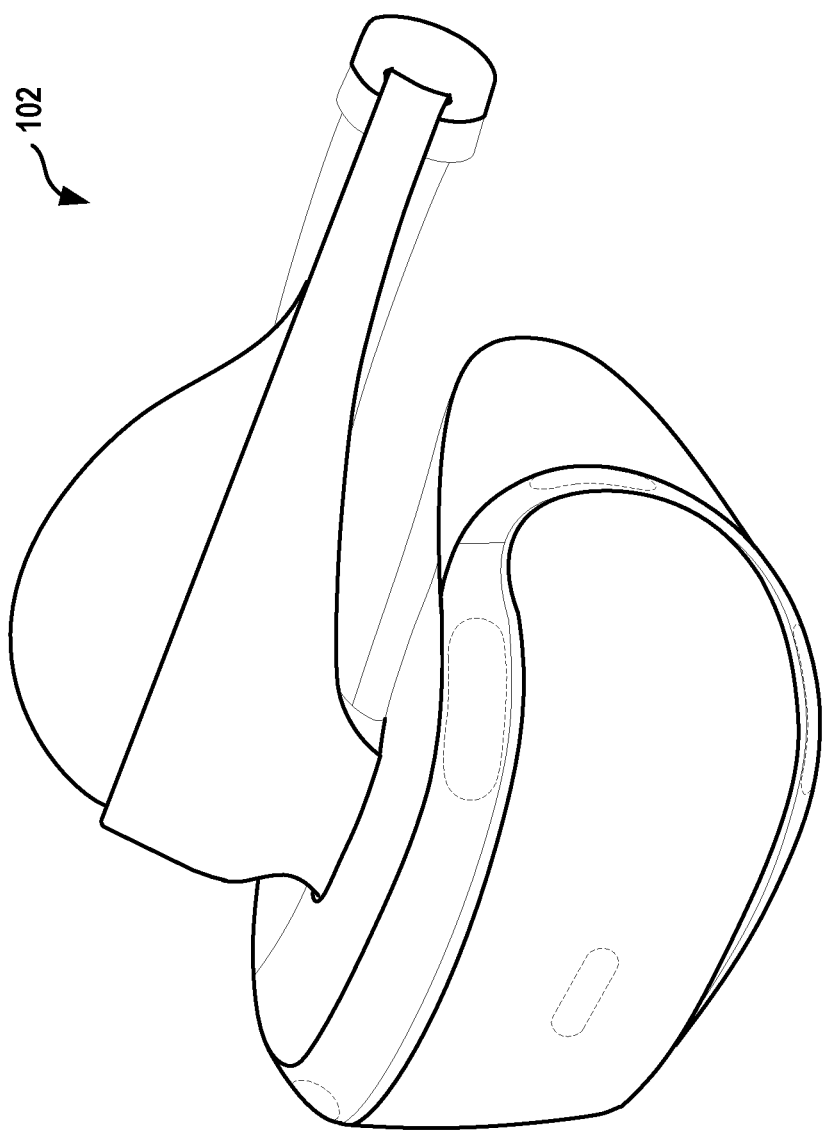
Figures 2, 8A:
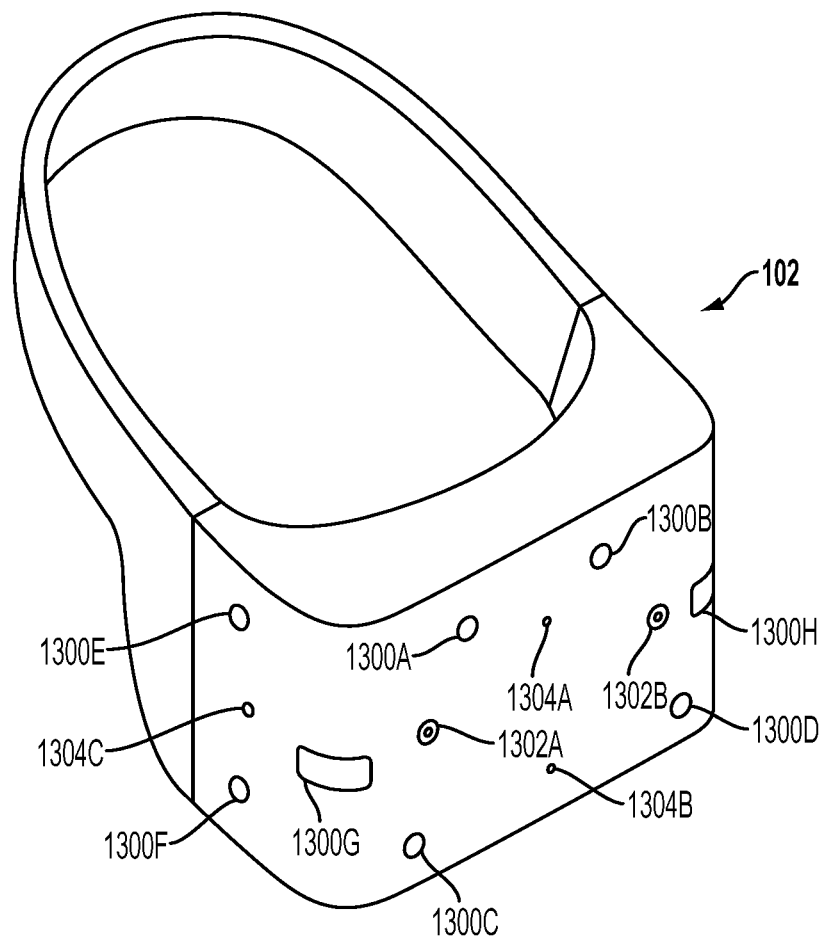

FIGS. 8A-1 and 8A-2 illustrate a head-mounted display (HMD), in accordance with an implementation of the disclosure. FIG. 8A-1 in particular illustrates the Playstation® VR headset, which is one example of a HMD in accordance with implementations of the disclosure. As shown, the HMD 102 includes a plurality of lights 1300A-H. Each of these lights may be configured to have specific shapes, and can be configured to have the same or different colors. The lights 1300A, 1300B, 1300C, and 1300D are arranged on the front surface of the HMD 102. The lights 1300E and 1300F are arranged on a side surface of the HMD 102. And the lights 1300G and 1300H are arranged at corners of the HMD 102, so as to span the front surface and a side surface of the HMD 102. It will be appreciated that the lights can be identified in captured images of an interactive environment in which a user uses the HMD 102. Based on identification and tracking of the lights, the location and orientation of the HMD 102 in the interactive environment can be determined. It will further be appreciated that some of the lights may or may not be visible depending upon the particular orientation of the HMD 102 relative to an image capture device. Also, different portions of lights (e.g. lights 1300G and 1300H) may be exposed for image capture depending upon the orientation of the HMD 102 relative to the image capture device.

In one implementation, the lights can be configured to indicate a current status of the HMD to others in the vicinity. For example, some or all of the lights may be configured to have a certain color arrangement, intensity arrangement, be configured to blink, have a certain on/off configuration, or other arrangement indicating a current status of the HMD 102. By way of example, the lights can be configured to display different configurations during active gameplay of a video game (generally gameplay occurring during an active timeline or within a scene of the game) versus other non-active gameplay aspects of a video game, such as navigating menu interfaces or configuring game settings (during which the game timeline or scene may be inactive or paused). The lights might also be configured to indicate relative intensity levels of gameplay. For example, the intensity of lights, or a rate of blinking, may increase when the intensity of gameplay increases. In this manner, a person external to the user may view the lights on the HMD 102 and understand that the user is actively engaged in intense gameplay, and may not wish to be disturbed at that moment.

The HMD 102 may additionally include one or more microphones. In the illustrated implementation, the HMD 102 includes microphones 1304A and 1304B defined on the front surface of the HMD 102, and microphone 1304C defined on a side surface of the HMD 102. By utilizing an array of microphones, sound from each of the microphones can be processed to determine the location of the sound's source. This information can be utilized in various ways, including exclusion of unwanted sound sources, association of a sound source with a visual identification, etc.

The HMD 102 may also include one or more image capture devices. In the illustrated implementation, the HMD 102 is shown to include image capture devices 1302A and 1302B. By utilizing a stereoscopic pair of image capture devices, three-dimensional (3D) images and video of the environment can be captured from the perspective of the HMD 102. Such video can be presented to the user to provide the user with a "video see-through" ability while wearing the HMD 102. That is, though the user cannot see through the HMD 102 in a strict sense, the video captured by the image capture devices 1302A and 1302B (e.g., or one or more external facing (e.g. front facing) cameras disposed on the outside body of the HMD 102) can nonetheless provide a functional equivalent of being able to see the environment external to the HMD 102 as if looking through the HMD 102. Such video can be augmented with virtual elements to provide an augmented reality experience, or may be combined or blended with virtual elements in other ways. Though in the illustrated implementation, two cameras are shown on the front surface of the HMD 102, it will be appreciated that there may be any number of externally facing cameras installed on the HMD 102, oriented in any direction. For example, in another implementation, there may be cameras mounted on the sides of the HMD 102 to provide additional panoramic image capture of the environment. Additionally, in some implementations, such externally facing cameras can be used to track other peripheral devices (e.g. controllers, etc.). That is, the location/orientation of a peripheral device relative to the HMD can be identified and tracked in captured images from such externally facing cameras on the HMD, and using the known location/orientation of the HMD in the local environment, then the true location/orientation of the peripheral device can be determined.

Figure 8B:
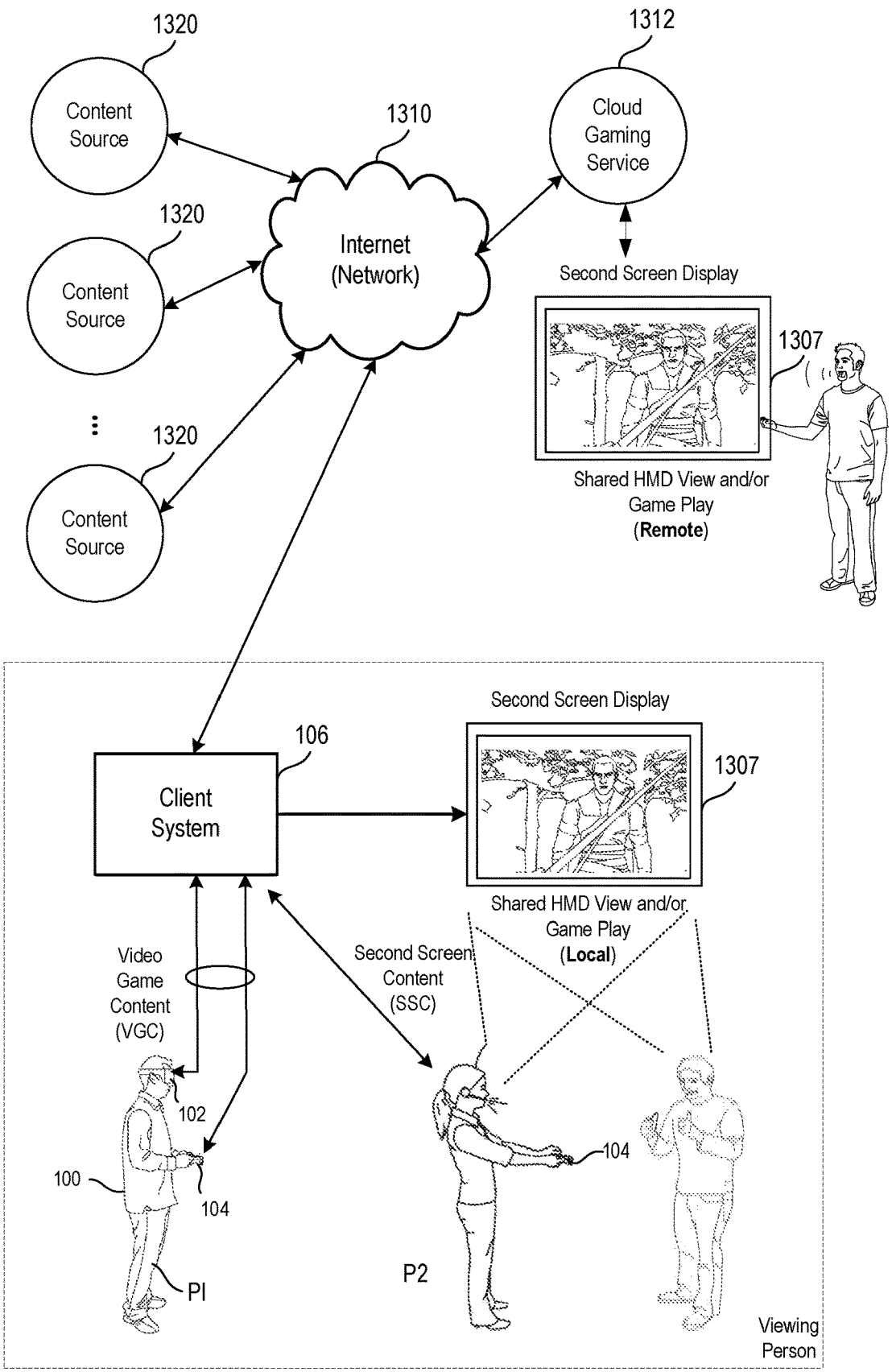
FIG. 8B illustrates one example of an HMD user interfacing with a client system, and the client system providing content to a second screen display, which is referred to as a second screen, in accordance with one implementation.

FIG. 8B illustrates one example of an HMD 102 user 100 interfacing with a client system 106, and the client system 106 providing content to a second screen display, which is referred to as a second screen 1307. The client system 106 may include integrated electronics for processing the sharing of content from the HMD 102 to the second screen 1307. Other implementations may include a separate device, module, connector, that will interface between the client system and each of the HMD 102 and the second screen 1307. In this general example, user 100 is wearing HMD 102 and is playing a video game using a controller, which may also be interface object 104. The interactive play by user 100 will produce video game content (VGC), which is displayed interactively to the HMD 102.

In one implementation, the content being displayed in the HMD 102 is shared to the second screen 1307. In one example, a person viewing the second screen 1307 can view the content being played interactively in the HMD 102 by user 100. In another implementation, another user (e.g. player 2) can interact with the client system 106 to produce second screen content (SSC). The second screen content produced by a player also interacting with the controller 104 (or any type of user interface, gesture, voice, or input), may be produced as SSC to the client system 106, which can be displayed on second screen 1307 along with the VGC received from the HMD 102.

Accordingly, the interactivity by other users who may be co-located or remote from an HMD user can be social, interactive, and more immersive to both the HMD user and users that may be viewing the content played by the HMD user on a second screen 1307. As illustrated, the client system 106 can be connected to the Internet 1310. The Internet can also provide access to the client system 106 to content from various content sources 1320. The content sources 1320 can include any type of content that is accessible over the Internet.

Such content, without limitation, can include video content, movie content, streaming content, social media content, news content, friend content, advertisement content, etc. In one implementation, the client system 106 can be used to simultaneously process content for an HMD user, such that the HMD is provided with multimedia content associated with the interactivity during gameplay. The client system 106 can then also provide other content, which may be unrelated to the video game content to the second screen. The client system 106 can, in one implementation receive the second screen content from one of the content sources 1320, or from a local user, or a remote user.

Figure 9:
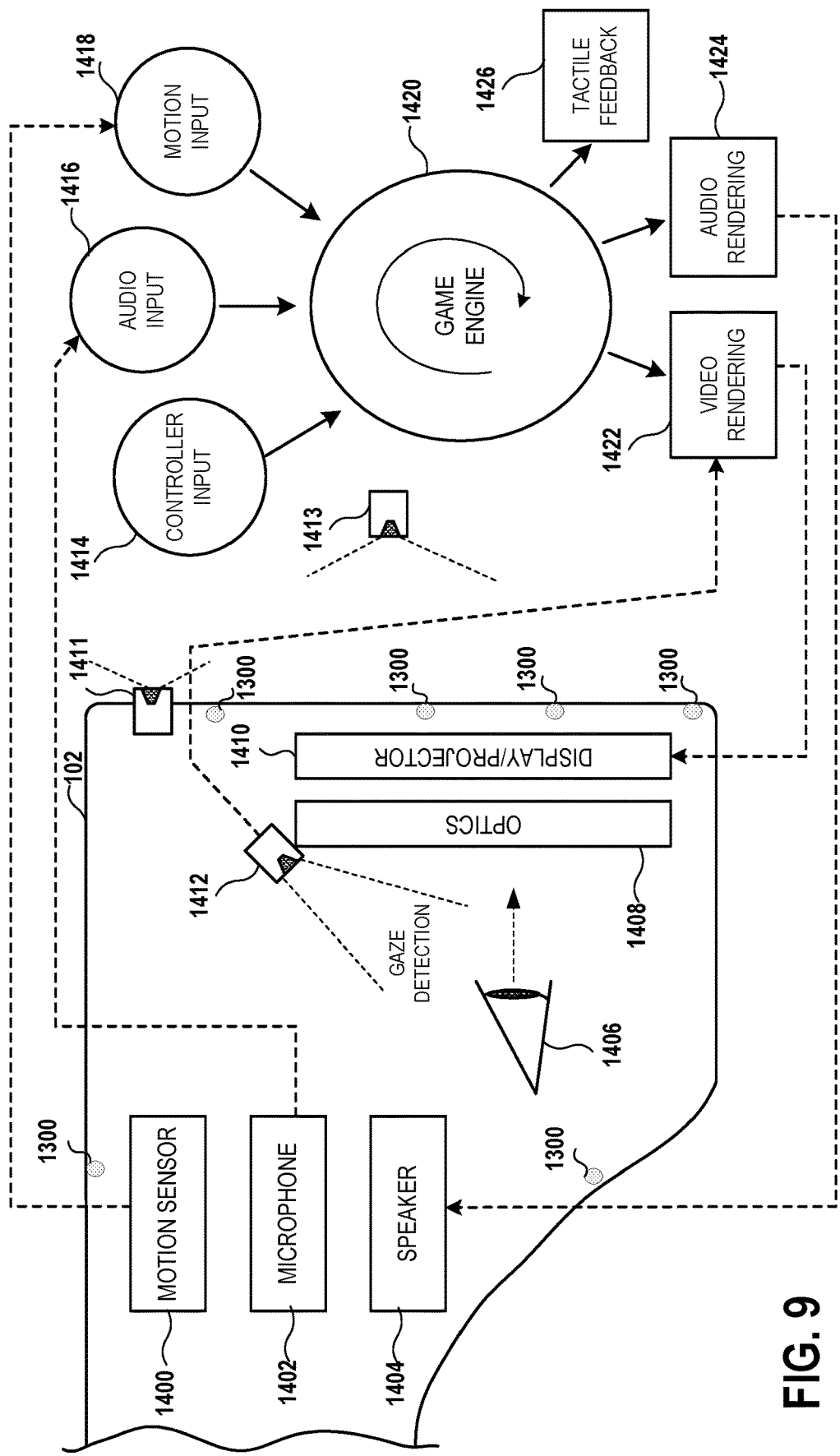
FIG. 9 conceptually illustrates the function of an HMD in conjunction with an executing video game, in accordance with an implementation of the disclosure.

FIG. 9 conceptually illustrates the function of the HMD 102 in conjunction with an executing video game or other application, in accordance with an implementation of the disclosure. The executing video game/application is defined by a game/application engine 1420 which receives inputs to update a game/application state of the video game/application. The game state of the video game can be defined, at least in part, by values of various parameters of the video game which define various aspects of the current gameplay, such as the presence and location of objects, the conditions of a virtual environment, the triggering of events, user profiles, view perspectives, etc.

In the illustrated implementation, the game engine receives, by way of example, controller input 1414, audio input 1416 and motion input 1418. The controller input 1414 may be defined from the operation of a gaming controller separate from the HMD 102, such as a handheld gaming controller (e.g. Sony DUALSHOCK®4 wireless controller, Sony PlayStation®Move motion controller) or directional interface object 104. By way of example, controller input 1414 may include directional inputs, button presses, trigger activation, movements, gestures, or other kinds of inputs processed from the operation of a gaming controller. In some implementations, the movements of a gaming controller are tracked through an externally facing camera 1411 of the HMD 102, which provides the location/orientation of the gaming controller relative to the HMD 102. The audio input 1416 can be processed from a microphone 1402 of the HMD 102, or from a microphone included in the image capture device 1413 or elsewhere in the local environment. The motion input 1418 can be processed from a motion sensor 1400 included in the HMD 102, and/or from image capture device 1413 as it captures images of the HMD 102, and/or from externally facing camera 1411 of the HMD 102. The game engine 1420 receives inputs which are processed according to the configuration of the game engine to update the game state of the video game. The game engine 1420 outputs game state data to various rendering modules which process the game state data to define content which will be presented to the user.

In the illustrated implementation, a video rendering module 1422 is defined to render a video stream for presentation on the HMD 102. The video stream may be presented by a display/projector mechanism 1410, and viewed through optics 1408 by the eye 1406 of the user. An audio rendering module 1404 is configured to render an audio stream for listening by the user. In one implementation, the audio stream is output through a speaker 1404 associated with the HMD 102. It should be appreciated that speaker 1404 may take the form of an open air speaker, headphones, or any other kind of speaker capable of presenting audio.

In one implementation, a gaze tracking camera 1412 is included in the HMD 102 to enable tracking of the gaze of the user. The gaze tracking camera captures images of the user's eyes, which are analyzed to determine the gaze direction of the user. In one implementation, information about the gaze direction of the user can be utilized to affect the video rendering. For example, if a user's eyes are determined to be looking in a specific direction, then the video rendering for that direction can be prioritized or emphasized, such as by providing greater detail or faster updates in the region where the user is looking. It should be appreciated that the gaze direction of the user can be defined relative to the head mounted display, relative to a real environment in which the user is situated, and/or relative to a virtual environment that is being rendered on the head mounted display.

Broadly speaking, analysis of images captured by the gaze tracking camera 1412, when considered alone, provides for a gaze direction of the user relative to the HMD 102. However, when considered in combination with the tracked location and orientation of the HMD 102, a real-world gaze direction of the user can be determined, as the location and orientation of the HMD 102 is synonymous with the location and orientation of the user's head. That is, the real-world gaze direction of the user can be determined from tracking the positional movements of the user's eyes and tracking the location and orientation of the HMD 102. When a view of a virtual environment is rendered on the HMD 102, the real-world gaze direction of the user can be applied to determine a virtual world gaze direction of the user in the virtual environment.

Additionally, a tactile feedback module 1426 is configured to provide signals to tactile feedback hardware included in either the HMD 102 or another device operated by the user, such as interface object 104. The tactile feedback may take the form of various kinds of tactile sensations, such as vibration feedback, temperature feedback, pressure feedback, etc. The interface object 104 can include corresponding hardware for rendering such forms of tactile feedback.

Figure 10:
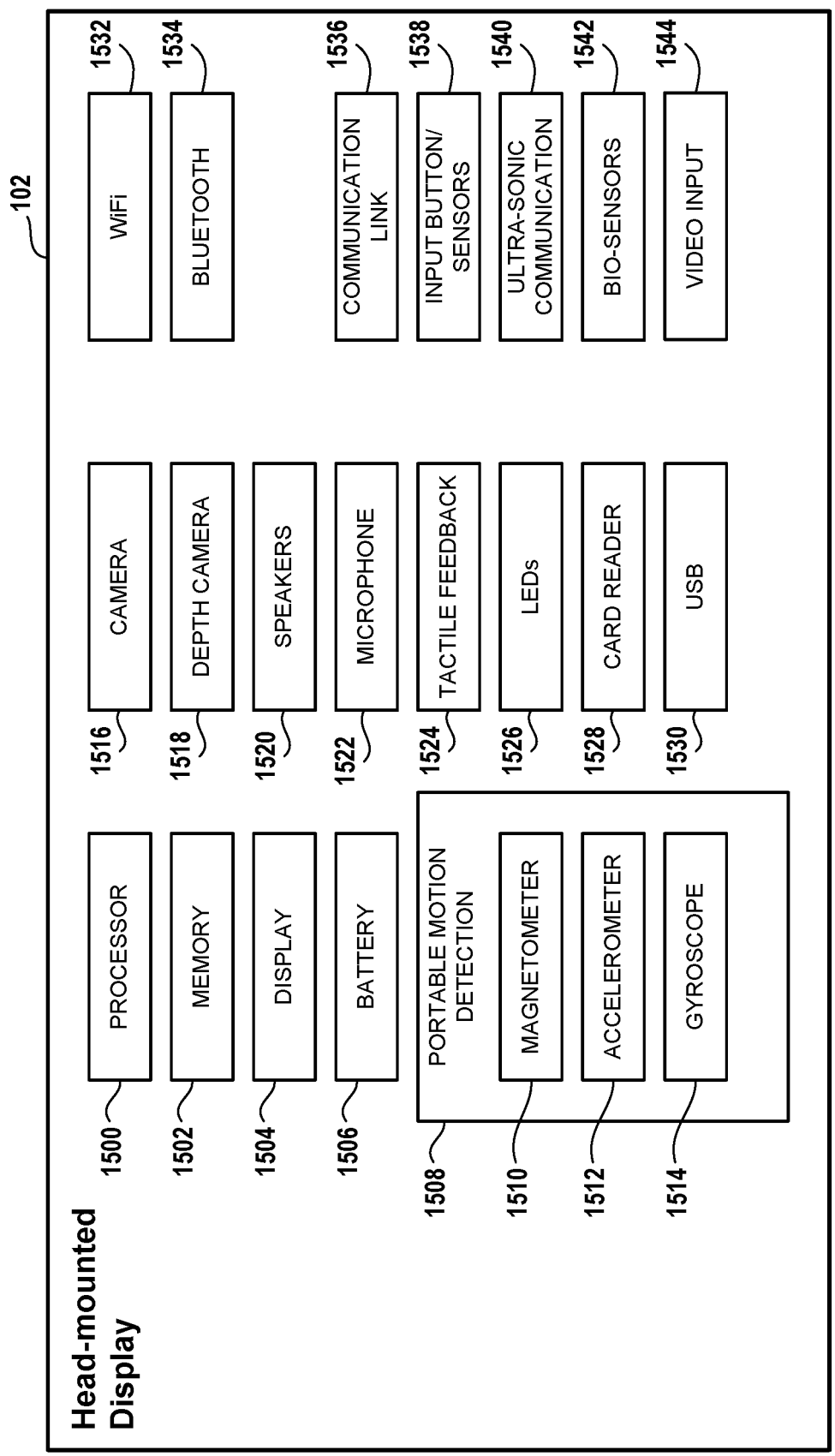
FIG. 10 illustrates components of a head-mounted display, in accordance with an implementation of the disclosure.

With reference to FIG. 10, a diagram illustrating components of a head-mounted display 102 is shown, in accordance with an implementation of the disclosure. The head-mounted display 102 includes a processor 1500 for executing program instructions. A memory 1502 is provided for storage purposes, and may include both volatile and non-volatile memory. A display 1504 is included which provides a visual interface that a user may view. A battery 1506 is provided as a power source for the head-mounted display 102. A motion detection module 1508 may include any of various kinds of motion sensitive hardware, such as a magnetometer 1510, an accelerometer 1512, and a gyroscope 1514.

An accelerometer is a device for measuring acceleration and gravity induced reaction forces. Single and multiple axis models are available to detect magnitude and direction of the acceleration in different directions. The accelerometer is used to sense inclination, vibration, and shock. In one implementation, three accelerometers 1512 are used to provide the direction of gravity, which gives an absolute reference for two angles (world-space pitch and world-space roll).

A magnetometer measures the strength and direction of the magnetic field in the vicinity of the head-mounted display. In one implementation, three magnetometers 1510 are used within the head-mounted display, ensuring an absolute reference for the world-space yaw angle. In one implementation, the magnetometer is designed to span the earth magnetic field, which is ±80 microtesla. Magnetometers are affected by metal, and provide a yaw measurement that is monotonic with actual yaw. The magnetic field may be warped due to metal in the environment, which causes a warp in the yaw measurement. If necessary, this warp can be calibrated using information from other sensors such as the gyroscope or the camera. In one implementation, accelerometer 1512 is used together with magnetometer 1510 to obtain the inclination and azimuth of the head-mounted display 102.

In some implementations, the magnetometers of the head-mounted display are configured so as to be read during times when electromagnets in other nearby devices are inactive.

A gyroscope is a device for measuring or maintaining orientation, based on the principles of angular momentum. In one implementation, three gyroscopes 1514 provide information about movement across the respective axis (x, y and z) based on inertial sensing. The gyroscopes help in detecting fast rotations. However, the gyroscopes can drift overtime without the existence of an absolute reference. This requires resetting the gyroscopes periodically, which can be done using other available information, such as positional/orientation determination based on visual tracking of an object, accelerometer, magnetometer, etc.

A camera 1516 is provided for capturing images and image streams of a real environment. More than one camera may be included in the head-mounted display 102, including a camera that is rear-facing (directed away from a user when the user is viewing the display of the head-mounted display 102), and a camera that is front-facing (directed towards the user when the user is viewing the display of the head-mounted display 102). Additionally, a depth camera 1518 may be included in the head-mounted display 102 for sensing depth information of objects in a real environment.

The head-mounted display 102 includes speakers 1520 for providing audio output. Also, a microphone 1522 may be included for capturing audio from the real environment, including sounds from the ambient environment, speech made by the user, etc. The head-mounted display 102 includes tactile feedback module 1524 for providing tactile feedback to the user. In one implementation, the tactile feedback module 1524 is capable of causing movement and/or vibration of the head-mounted display 102 so as to provide tactile feedback to the user.

LEDs 1526 are provided as visual indicators of statuses of the head-mounted display 102. For example, an LED may indicate battery level, power on, etc. A card reader 1528 is provided to enable the head-mounted display 102 to read and write information to and from a memory card. A USB interface 1530 is included as one example of an interface for enabling connection of peripheral devices, or connection to other devices, such as other portable devices, computers, etc. In various implementations of the head-mounted display 102, any of various kinds of interfaces may be included to enable greater connectivity of the head-mounted display 102.

A WiFi module 1532 is included for enabling connection to the Internet or a local area network via wireless networking technologies. Also, the head-mounted display 102 includes a Bluetooth module 1534 for enabling wireless connection to other devices. A communications link 1536 may also be included for connection to other devices. In one implementation, the communications link 1536 utilizes infrared transmission for wireless communication. In other implementations, the communications link 1536 may utilize any of various wireless or wired transmission protocols for communication with other devices.

Input buttons/sensors 1538 are included to provide an input interface for the user. Any of various kinds of input interfaces may be included, such as buttons, touchpad, joystick, trackball, etc. An ultra-sonic communication module 1540 may be included in head-mounted display 102 for facilitating communication with other devices via ultrasonic technologies.

Bio-sensors 1542 are included to enable detection of physiological data from a user. In one implementation, the bio-sensors 1542 include one or more dry electrodes for detecting bio-electric signals of the user through the user's skin.

A video input 1544 is configured to receive a video signal from a primary processing computer (e.g. main game console) for rendering on the HMD. In some implementations, the video input is an HDMI input.

The foregoing components of head-mounted display 102 have been described as merely exemplary components that may be included in head-mounted display 102. In various implementations of the disclosure, the head-mounted display 102 may or may not include some of the various aforementioned components. Implementations of the head-mounted display 102 may additionally include other components not presently described, but known in the art, for purposes of facilitating aspects of the present disclosure as herein described.

Figure 11:
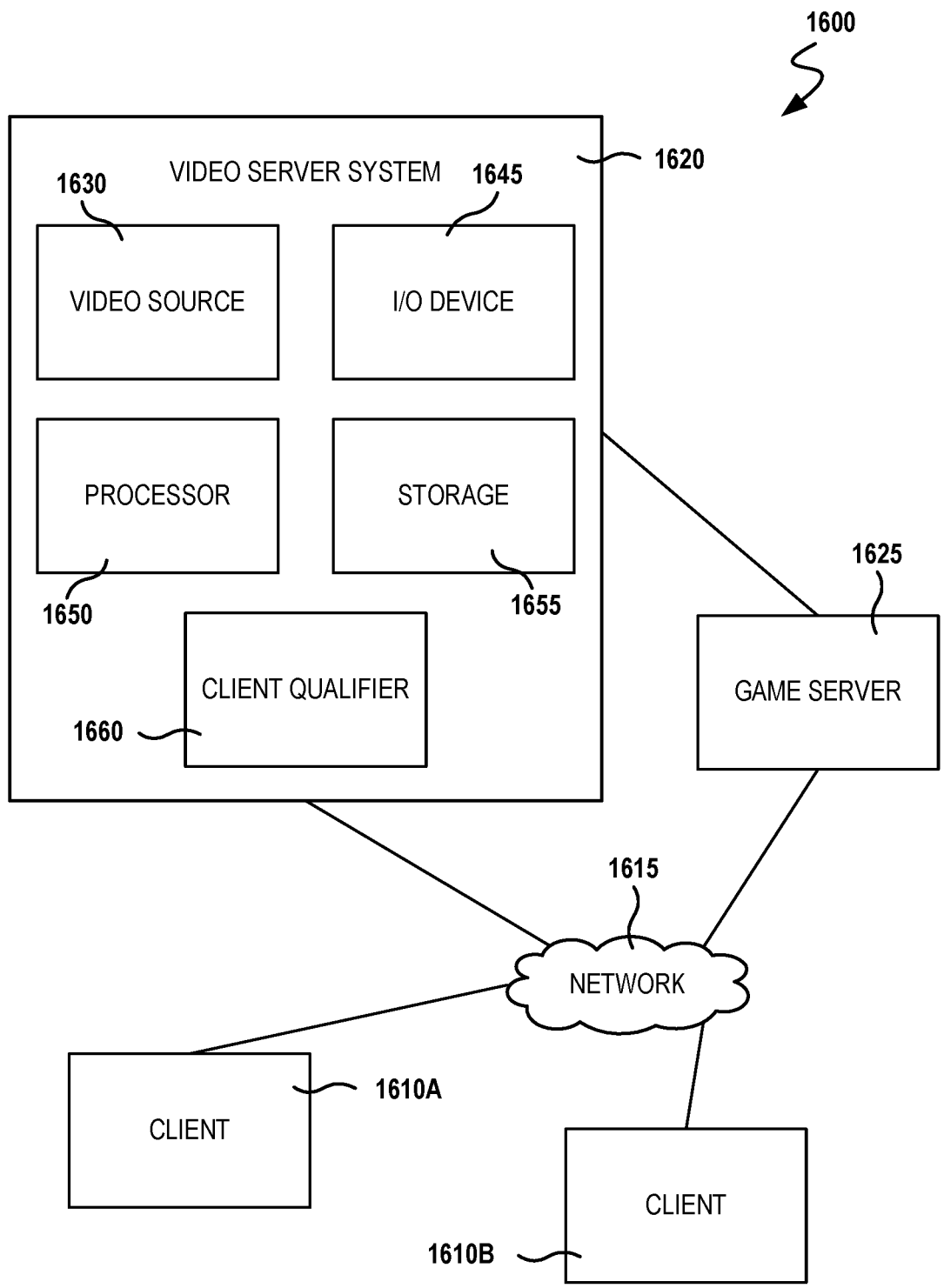
FIG. 11 is a block diagram of a Game System 1600, according to various implementations of the disclosure.

FIG. 11 is a block diagram of a Game System 1600, according to various implementations of the disclosure. Game System 1600 is configured to provide a video stream to one or more Clients 1610 via a Network 1615. Game System 1600 typically includes a Video Server System 1620 and an optional game server 1625. Video Server System 1620 is configured to provide the video stream to the one or more Clients 1610 with a minimal quality of service. For example, Video Server System 1620 may receive a game command that changes the state of or a point of view within a video game, and provide Clients 1610 with an updated video stream reflecting this change in state with minimal lag time. The Video Server System 1620 may be configured to provide the video stream in a wide variety of alternative video formats, including formats yet to be defined. Further, the video stream may include video frames configured for presentation to a user at a wide variety of frame rates. Typical frame rates are 30 frames per second, 60 frames per second, and 120 frames per second. Although higher or lower frame rates are included in alternative implementations of the disclosure.

Clients 1610, referred to herein individually as 1610A, 1610B, etc., may include head mounted displays, terminals, personal computers, game consoles, tablet computers, telephones, set top boxes, kiosks, wireless devices, digital pads, stand-alone devices, handheld game playing devices, and/or the like. Typically, Clients 1610 are configured to receive encoded video streams, decode the video streams, and present the resulting video to a user, e.g., a player of a game. The processes of receiving encoded video streams and/or decoding the video streams typically includes storing individual video frames in a receive buffer of the Client. The video streams may be presented to the user on a display integral to Client 1610 or on a separate device such as a monitor or television. Clients 1610 are optionally configured to support more than one game player. For example, a game console may be configured to support two, three, four or more simultaneous players. Each of these players may receive a separate video stream, or a single video stream may include regions of a frame generated specifically for each player, e.g., generated based on each player's point of view. Clients 1610 are optionally geographically dispersed. The number of clients included in Game System 1600 may vary widely from one or two to thousands, tens of thousands, or more. As used herein, the term "game player" is used to refer to a person that plays a game and the term "game playing device" is used to refer to a device used to play a game. In some implementations, the game playing device may refer to a plurality of computing devices that cooperate to deliver a game experience to the user. For example, a game console and an HMD may cooperate with the video server system 1620 to deliver a game viewed through the HMD. In one implementation, the game console receives the video stream from the video server system 1620, and the game console forwards the video stream, or updates to the video stream, to the HMD for rendering.

Clients 1610 are configured to receive video streams via Network 1615. Network 1615 may be any type of communication network including, a telephone network, the Internet, wireless networks, powerline networks, local area networks, wide area networks, private networks, and/or the like. In typical implementations, the video streams are communicated via standard protocols, such as TCP/IP or UDP/IP. Alternatively, the video streams are communicated via proprietary standards.

A typical example of Clients 1610 is a personal computer comprising a processor, non-volatile memory, a display, decoding logic, network communication capabilities, and input devices. The decoding logic may include hardware, firmware, and/or software stored on a computer readable medium. Systems for decoding (and encoding) video streams are well known in the art and vary depending on the particular encoding scheme used.

Clients 1610 may, but are not required to, further include systems configured for modifying received video. For example, a Client may be configured to perform further rendering, to overlay one video image on another video image, to crop a video image, and/or the like. For example, Clients 1610 may be configured to receive various types of video frames, such as I-frames, P-frames and B-frames, and to process these frames into images for display to a user. In some implementations, a member of Clients 1610 is configured to perform further rendering, shading, conversion to 3-D, or like operations on the video stream. A member of Clients 1610 is optionally configured to receive more than one audio or video stream. Input devices of Clients 1610 may include, for example, a one-hand game controller, a two-hand game controller, a gesture recognition system, a gaze recognition system, a voice recognition system, a keyboard, a joystick, a pointing device, a force feedback device, a motion and/or location sensing device, a mouse, a touch screen, a neural interface, a camera, input devices yet to be developed, and/or the like.

The video stream (and optionally audio stream) received by Clients 1610 is generated and provided by Video Server System 1620. As is described further elsewhere herein, this video stream includes video frames (and the audio stream includes audio frames). The video frames are configured (e.g., they include pixel information in an appropriate data structure) to contribute meaningfully to the images displayed to the user. As used herein, the term "video frames" is used to refer to frames including predominantly information that is configured to contribute to, e.g. to effect, the images shown to the user. Most of the teachings herein with regard to "video frames" can also be applied to "audio frames."

Clients 1610 are typically configured to receive inputs from a user. These inputs may include game commands configured to change the state of the video game or otherwise affect game play. The game commands can be received using input devices and/or may be automatically generated by computing instructions executing on Clients 1610. The received game commands are communicated from Clients 1610 via Network 1615 to Video Server System 1620 and/or Game Server 1625. For example, in some implementations, the game commands are communicated to Game Server 1625 via Video Server System 1620. In some implementations, separate copies of the game commands are communicated from Clients 1610 to Game Server 1625 and Video Server System 1620. The communication of game commands is optionally dependent on the identity of the command. Game commands are optionally communicated from Client 1610A through a different route or communication channel that that used to provide audio or video streams to Client 1610A.

Game Server 1625 is optionally operated by a different entity than Video Server System 1620. For example, Game Server 1625 may be operated by the publisher of a multi-player game. In this example, Video Server System 1620 is optionally viewed as a client by Game Server 1625 and optionally configured to appear from the point of view of Game Server 1625 to be a prior art client executing a prior art game engine. Communication between Video Server System 1620 and Game Server 1625 optionally occurs via Network 1615. As such, Game Server 1625 can be a prior art multiplayer game server that sends game state information to multiple clients, one of which is game server system 1620. Video Server System 1620 may be configured to communicate with multiple instances of Game Server 1625 at the same time. For example, Video Server System 1620 can be configured to provide a plurality of different video games to different users. Each of these different video games may be supported by a different Game Server 1625 and/or published by different entities. In some implementations, several geographically distributed instances of Video Server System 1620 are configured to provide game video to a plurality of different users. Each of these instances of Video Server System 1620 may be in communication with the same instance of Game Server 1625. Communication between Video Server System 1620 and one or more Game Server 1625 optionally occurs via a dedicated communication channel. For example, Video Server System 1620 may be connected to Game Server 1625 via a high bandwidth channel that is dedicated to communication between these two systems.

Video Server System 1620 comprises at least a Video Source 1630, an I/O Device 1645, a Processor 1650, and non-transitory Storage 1655. Video Server System 1620 may include one computing device or be distributed among a plurality of computing devices. These computing devices are optionally connected via a communications system such as a local area network.

Video Source 1630 is configured to provide a video stream, e.g., streaming video or a series of video frames that form a moving picture. In some implementations, Video Source 1630 includes a video game engine and rendering logic. The video game engine is configured to receive game commands from a player and to maintain a copy of the state of the video game based on the received commands. This game state includes the position of objects in a game environment, as well as typically a point of view. The game state may also include properties, images, colors and/or textures of objects. The game state is typically maintained based on game rules, as well as game commands such as move, turn, attack, set focus to, interact, use, and/or the like. Part of the game engine is optionally disposed within Game Server 1625. Game Server 1625 may maintain a copy of the state of the game based on game commands received from multiple players using geographically disperse clients. In these cases, the game state is provided by Game Server 1625 to Video Source 1630, wherein a copy of the game state is stored and rendering is performed. Game Server 1625 may receive game commands directly from Clients 1610 via Network 1615, and/or may receive game commands via Video Server System 1620.

Video Source 1630 typically includes rendering logic, e.g., hardware, firmware, and/or software stored on a computer readable medium such as Storage 1655. This rendering logic is configured to create video frames of the video stream based on the game state. All or part of the rendering logic is optionally disposed within a graphics processing unit (GPU). Rendering logic typically includes processing stages configured for determining the three-dimensional spatial relationships between objects and/or for applying appropriate textures, etc., based on the game state and viewpoint. The rendering logic produces raw video that is then usually encoded prior to communication to Clients 1610. For example, the raw video may be encoded according to an Adobe Flash® standard, .wav, H.264, H.263, On2, VP6, VC-1, WMA, Huffyuv, Lagarith, MPG-x. Xvid. FFmpeg, x264, VP6-8, realvideo, mp3, or the like. The encoding process produces a video stream that is optionally packaged for delivery to a decoder on a remote device. The video stream is characterized by a frame size and a frame rate. Typical frame sizes include 800×600, 1280×720 (e.g., 720p), 1024×768, although any other frame sizes may be used. The frame rate is the number of video frames per second. A video stream may include different types of video frames. For example, the H.264 standard includes a "P" frame and a "I" frame. I-frames include information to refresh all macro blocks/pixels on a display device, while P-frames include information to refresh a subset thereof. P-frames are typically smaller in data size than are I-frames. As used herein the term "frame size" is meant to refer to a number of pixels within a frame. The term "frame data size" is used to refer to a number of bytes required to store the frame.

In alternative implementations Video Source 1630 includes a video recording device such as a camera. This camera may be used to generate delayed or live video that can be included in the video stream of a computer game. The resulting video stream optionally includes both rendered images and images recorded using a still or video camera. Video Source 1630 may also include storage devices configured to store previously recorded video to be included in a video stream. Video Source 1630 may also include motion or positioning sensing devices configured to detect motion or position of an object, e.g., person, and logic configured to determine a game state or produce video-based on the detected motion and/or position.

Video Source 1630 is optionally configured to provide overlays configured to be placed on other video. For example, these overlays may include a command interface, log in instructions, messages to a game player, images of other game players, video feeds of other game players (e.g., webcam video). In implementations of Client 1610A including a touch screen interface or a gaze detection interface, the overlay may include a virtual keyboard, joystick, touch pad, and/or the like. In one example of an overlay a player's voice is overlaid on an audio stream. Video Source 1630 optionally further includes one or more audio sources.

In implementations wherein Video Server System 1620 is configured to maintain the game state based on input from more than one player, each player may have a different point of view comprising a position and direction of view. Video Source 1630 is optionally configured to provide a separate video stream for each player based on their point of view. Further, Video Source 1630 may be configured to provide a different frame size, frame data size, and/or encoding to each of Client 1610. Video Source 1630 is optionally configured to provide 3-D video.

I/O Device 1645 is configured for Video Server System 1620 to send and/or receive information such as video, commands, requests for information, a game state, gaze information, device motion, device location, user motion, client identities, player identities, game commands, security information, audio, and/or the like. I/O Device 1645 typically includes communication hardware such as a network card or modem. I/O Device 1645 is configured to communicate with Game Server 1625, Network 1615, and/or Clients 1610.

Processor 1650 is configured to execute logic, e.g. software, included within the various components of Video Server System 1620 discussed herein. For example, Processor 1650 may be programmed with software instructions in order to perform the functions of Video Source 1630, Game Server 1625, and/or a Client Qualifier 1660. Video Server System 1620 optionally includes more than one instance of Processor 1650. Processor 1650 may also be programmed with software instructions in order to execute commands received by Video Server System 1620, or to coordinate the operation of the various elements of Game System 1600 discussed herein. Processor 1650 may include one or more hardware device. Processor 1650 is an electronic processor.

Storage 1655 includes non-transitory analog and/or digital storage devices. For example, Storage 1655 may include an analog storage device configured to store video frames. Storage 1655 may include a computer readable digital storage, e.g. a hard drive, an optical drive, or solid state storage. Storage 1615 is configured (e.g. by way of an appropriate data structure or file system) to store video frames, artificial frames, a video stream including both video frames and artificial frames, audio frame, an audio stream, and/or the like. Storage 1655 is optionally distributed among a plurality of devices. In some implementations, Storage 1655 is configured to store the software components of Video Source 1630 discussed elsewhere herein. These components may be stored in a format ready to be provisioned when needed.

Video Server System 1620 optionally further comprises Client Qualifier 1660. Client Qualifier 1660 is configured for remotely determining the capabilities of a client, such as Clients 1610A or 1610B. These capabilities can include both the capabilities of Client 1610A itself as well as the capabilities of one or more communication channels between Client 1610A and Video Server System 1620. For example, Client Qualifier 1660 may be configured to test a communication channel through Network 1615.

Client Qualifier 1660 can determine (e.g., discover) the capabilities of Client 1610A manually or automatically. Manual determination includes communicating with a user of Client 1610A and asking the user to provide capabilities. For example, in some implementations, Client Qualifier 1660 is configured to display images, text, and/or the like within a browser of Client 1610A. In one implementation, Client 1610A is an HMD that includes a browser. In another implementation, client 1610A is a game console having a browser, which may be displayed on the HMD. The displayed objects request that the user enter information such as operating system, processor, video decoder type, type of network connection, display resolution, etc. of Client 1610A. The information entered by the user is communicated back to Client Qualifier 1660.

Automatic determination may occur, for example, by execution of an agent on Client 1610A and/or by sending test video to Client 1610A. The agent may comprise computing instructions, such as java script, embedded in a web page or installed as an add-on. The agent is optionally provided by Client Qualifier 1660. In various implementations, the agent can find out processing power of Client 1610A, decoding and display capabilities of Client 1610A, lag time reliability and bandwidth of communication channels between Client 1610A and Video Server System 1620, a display type of Client 1610A, firewalls present on Client 1610A, hardware of Client 1610A, software executing on Client 1610A, registry entries within Client 1610A, and/or the like.

Client Qualifier 1660 includes hardware, firmware, and/or software stored on a computer readable medium. Client Qualifier 1660 is optionally disposed on a computing device separate from one or more other elements of Video Server System 1620. For example, in some implementations, Client Qualifier 1660 is configured to determine the characteristics of communication channels between Clients 1610 and more than one instance of Video Server System 1620. In these implementations the information discovered by Client Qualifier can be used to determine which instance of Video Server System 1620 is best suited for delivery of streaming video to one of Clients 1610.

Implementations of the present disclosure may be practiced with various computer system configurations including hand-held devices, microprocessor systems, microprocessor-based or programmable consumer electronics, minicomputers, mainframe computers and the like. The disclosure can also be practiced in distributed computing environments where tasks are performed by remote processing devices that are linked through a wire-based or wireless network.

With the above implementations in mind, it should be understood that the disclosure can employ various computer-implemented operations involving data stored in computer systems. These operations are those requiring physical manipulation of physical quantities. Any of the operations described herein that form part of the disclosure are useful machine operations. The disclosure also relates to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The disclosure can also be embodied as computer readable code on a computer readable medium. The computer readable medium is any data storage device that can store data, which can thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing disclosure has been described in some detail for purposes of clarity of understanding, it will be apparent that certain changes and modifications can be practiced within the scope of the appended claims. Accordingly, the present implementations are to be considered as illustrative and not restrictive, and the disclosure is not to be limited to the details given herein, but may be modified within the scope and equivalents of the present disclosure.

What is claimed is:

1. A system, comprising:
    a computing device that executes an interactive application and generates and transmits image frames at a predefined frame rate, the image frames being generated based on an application state of the executing interactive application;
    a head-mounted display (HMD) that receives the image frames transmitted from the computing device and presents the image frames through a display device of the HMD, wherein the HMD includes a magnetic emitter that emits a magnetic signal, the magnetic signal having a synchronization encoding that is synchronized to the received image frames from the computing device;
    a controller device that includes a magnetic sensor that detects the magnetic signal, wherein the controller device processes the detected magnetic signal to determine magnetic position data that identifies a location and/or orientation of the controller device, wherein the controller device further processes the detected magnetic signal to read the synchronization encoding, wherein the controller device uses the synchronization encoding to generate corresponding timing data for the magnetic position data, the timing data indicating a timing of the magnetic position data based on the synchronization encoding, wherein the controller device transmits the magnetic position data and the corresponding timing data to the computing device;
    wherein the computing device uses the magnetic position data and the corresponding timing data to determine the location and/or orientation of the controller device, wherein the computing device uses the location and/or orientation of the controller device to update the application state of the executing interactive application;
    wherein the controller device includes at least one motion sensor that generates samples of motion data, wherein the controller device uses the synchronization encoding to generate a corresponding time stamp for each sample of motion sensor data, and wherein the controller device transmits the samples of motion data and the corresponding time stamps to the computing device;
    wherein the computing device uses the samples of motion data and the corresponding time stamps to determine a location and/or orientation of the controller device, the location and/or orientation of the controller device being used to update the application state of the executing interactive application.

2. The system of claim 1, wherein the transmission of the image frames is defined by transmission of video signals including a timing signal that signals a beginning of each image frame in accordance with the predefined frame rate; wherein the synchronization encoding of the magnetic signal is synchronized to the timing signal.

3. The system of claim 2, wherein the timing signal is a vertical sync signal.

4. The system of claim 1, wherein the synchronization encoding of the magnetic signal is defined by modulation of one or more of a frequency or an amplitude of the magnetic signal.

5. The system of claim 4, wherein the modulation defines a repeated pattern of changes to the magnetic signal that is synchronized to the timing signal.

6. The system of claim 1, wherein generating the corresponding timing data includes using the synchronization encoding to correct for a drift of a clock of the controller device from the synchronization encoding.

7. The system of claim 1, wherein the location and/or orientation of the controller device is relative to the HMD.

8. The system of claim 1, wherein the timing data enables synchronization of the magnetic position data to the generation of the image frames.

9. The system of claim 1, wherein generating the corresponding time stamp for a given sample of motion sensor data includes using the synchronization encoding to correct for a drift of a clock of the controller device from the synchronization encoding.

10. A method, comprising:
    executing, by a computing device, an interactive application and generating and transmitting image frames at a predefined frame rate by the computing device, the image frames being generated based on an application state of the executing interactive application;
    receiving, by a head-mounted display (HMD), the image frames transmitted from the computing device and presenting the image frames through a display device of the HMD, and emitting, by a magnetic emitter of the HMD, a magnetic signal, the magnetic signal having a synchronization encoding that is synchronized to the received image frames from the computing device;
    detecting, by a controller device that includes a magnetic sensor, the magnetic signal, and processing, by the controller device, the detected magnetic signal to determine magnetic position data that identifies a location and/or orientation of the controller device, wherein the controller device further processes the detected magnetic signal to read the synchronization encoding, wherein the controller device uses the synchronization encoding to generate corresponding timing data for the magnetic position data, the timing data indicating a timing of the magnetic position data based on the synchronization encoding, wherein the controller device transmits the magnetic position data and the corresponding timing data to the computing device;
    wherein the computing device uses the magnetic position data and the corresponding timing data to determine the location and/or orientation of the controller device, wherein the computing device uses the location and/or orientation of the controller device to update the application state of the executing interactive application;
    wherein the controller device includes at least one motion sensor that generates samples of motion data, wherein the controller device uses the synchronization encoding to generate a corresponding time stamp for each sample of motion sensor data, and wherein the controller device transmits the samples of motion data and the corresponding time stamps to the computing device;

wherein the computing device uses the samples of motion data and the corresponding time stamps to determine a location and/or orientation of the controller device, the location and/or orientation of the controller device being used to update the application state of the executing interactive application.

11. The method of claim 10, wherein the transmission of the image frames is defined by transmission of video signals including a timing signal that signals a beginning of each image frame in accordance with the predefined frame rate;

wherein the synchronization encoding of the magnetic signal is synchronized to the timing signal.

12. The method of claim 11, wherein the timing signal is a vertical sync signal.

13. The method of claim 10, wherein the synchronization encoding of the magnetic signal is defined by modulation of one or more of a frequency or an amplitude of the magnetic signal.

14. The method of claim 13, wherein the modulation defines a repeated pattern of changes to the magnetic signal that is synchronized to the timing signal.

15. The method of claim 10, wherein generating the corresponding timing data includes using the synchronization encoding to correct for a drift of a clock of the controller device from the synchronization encoding.

16. The method of claim 10, wherein the location and/or orientation of the controller device is relative to the HMD.

17. The method of claim 10, wherein the timing data enables synchronization of the magnetic position data to the generation of the image frames.

18. The method of claim 10, wherein generating the corresponding time stamp for a given sample of motion sensor data includes using the synchronization encoding to correct for a drift of a clock of the controller device from the synchronization encoding.

* * * * *